US009223956B2

(12) United States Patent
Hong et al.

(10) Patent No.: US 9,223,956 B2
(45) Date of Patent: Dec. 29, 2015

(54) MOBILE TERMINAL AND METHOD FOR CONTROLLING THE SAME

(71) Applicant: LG ELECTRONICS INC., Seoul (KR)

(72) Inventors: Sayoon Hong, Seoul (KR); Jongho Kim, Seoul (KR); Eunhyung Cho, Seoul (KR); Doyoung Lee, Seoul (KR); Sinae Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/467,720

(22) Filed: Aug. 25, 2014

(65) Prior Publication Data
US 2015/0278498 A1    Oct. 1, 2015

(30) Foreign Application Priority Data

Mar. 28, 2014    (KR) .......................... 10-2014-0037156

(51) Int. Cl.
*G06K 7/00*    (2006.01)
*G06F 21/32*    (2013.01)
(52) U.S. Cl.
CPC ..................................... *G06F 21/32* (2013.01)
(58) Field of Classification Search
USPC .......... 235/375, 379, 380, 435, 439, 487, 492
See application file for complete search history.

(56) References Cited

U.S. PATENT DOCUMENTS

| 2012/0096188 A1 | 4/2012 | Cohen et al. |
| 2014/0068744 A1 | 3/2014 | Bran et al. |
| 2014/0263648 A1* | 9/2014 | Van Bosch et al. ........... 235/450 |

FOREIGN PATENT DOCUMENTS

KR    10-2013-0028570 A    3/2013

* cited by examiner

*Primary Examiner* — Matthew Mikels
(74) *Attorney, Agent, or Firm* — Birch, Stewart, Kolasch & Birch, LLP

(57) ABSTRACT

A mobile terminal and a control method thereof are disclosed. According to the embodiments of the present disclosure, a mobile terminal may include a mobile terminal body, a wireless communication unit configured to receive an information input request for user authentication from an external server connected to the body, and a controller configured to transmit a wireless signal for sensing the wearing of a second mobile terminal formed to be paired with the body and wearable on a specific portion of a human body to the second mobile terminal in response to the request, wherein the controller performs wearer authentication for the second mobile terminal in response to receiving at least one of a response signal to the wireless signal from the second mobile terminal and a wearer's biometric signal sensed through the second mobile terminal, and controls the authentication method of the user authentication or processing for an information input corresponding to the authentication method to be determined in a different manner based on at least one of the execution result of the wearer authentication and the analysis result of the received biometric signal.

17 Claims, 14 Drawing Sheets

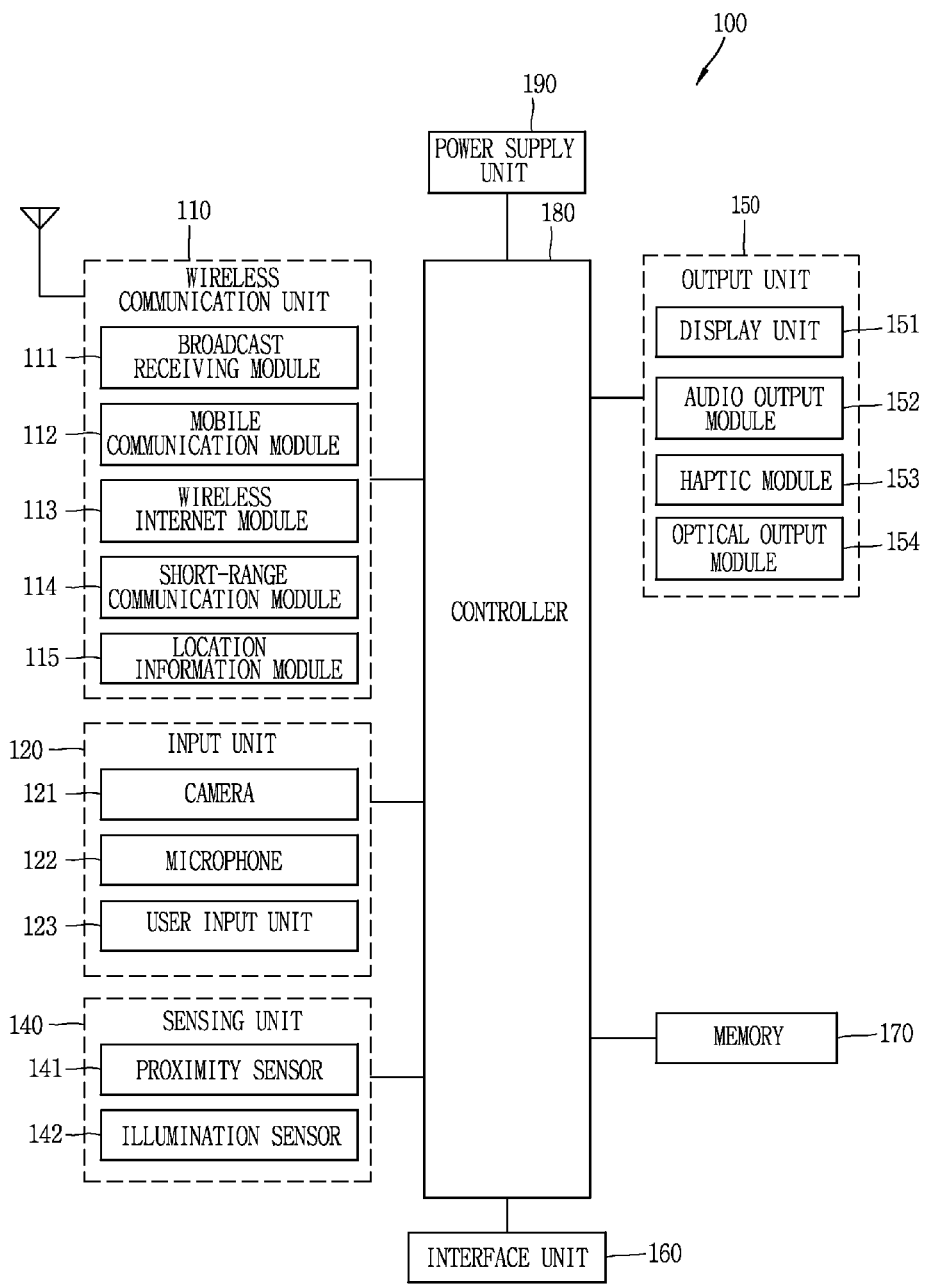

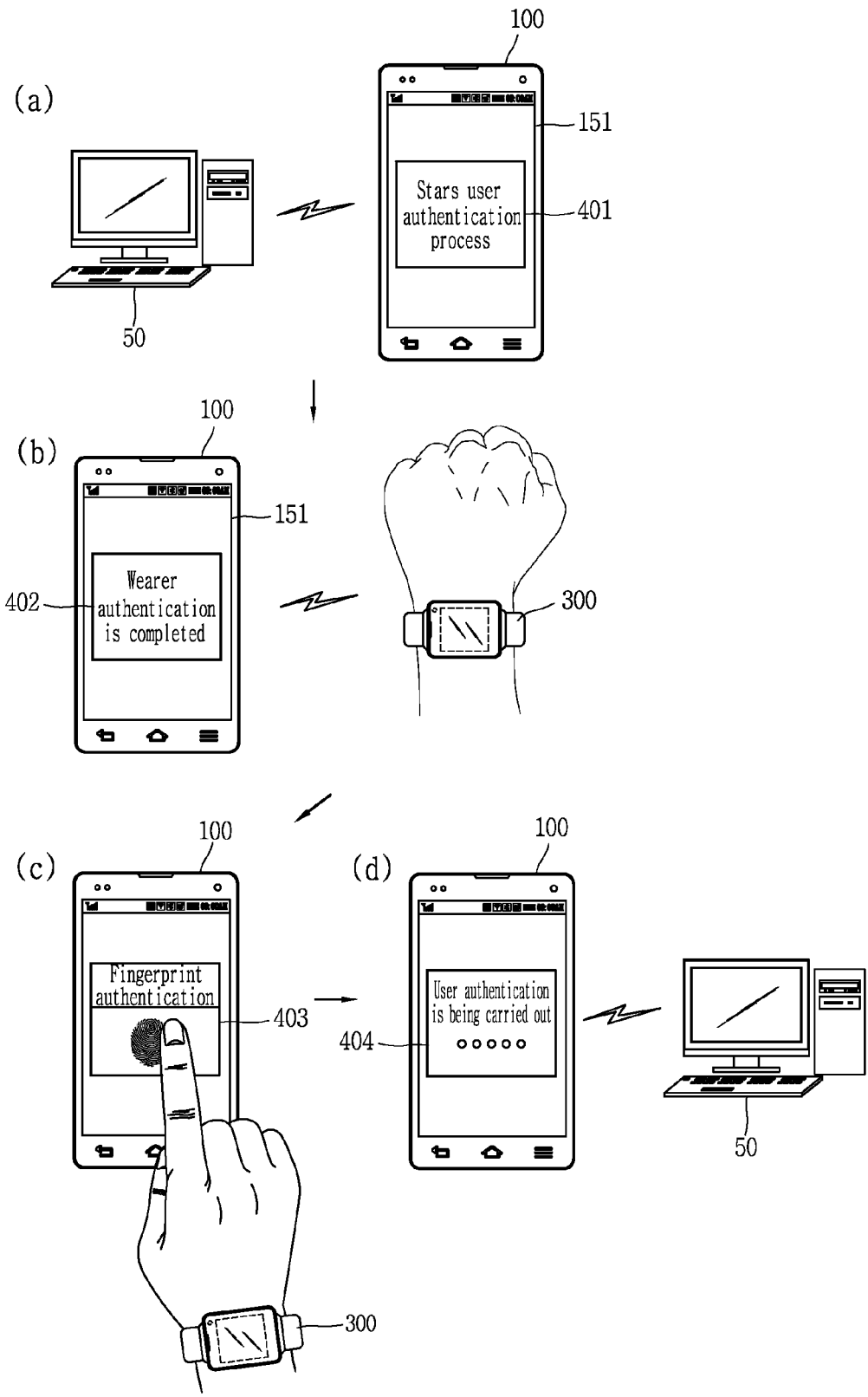

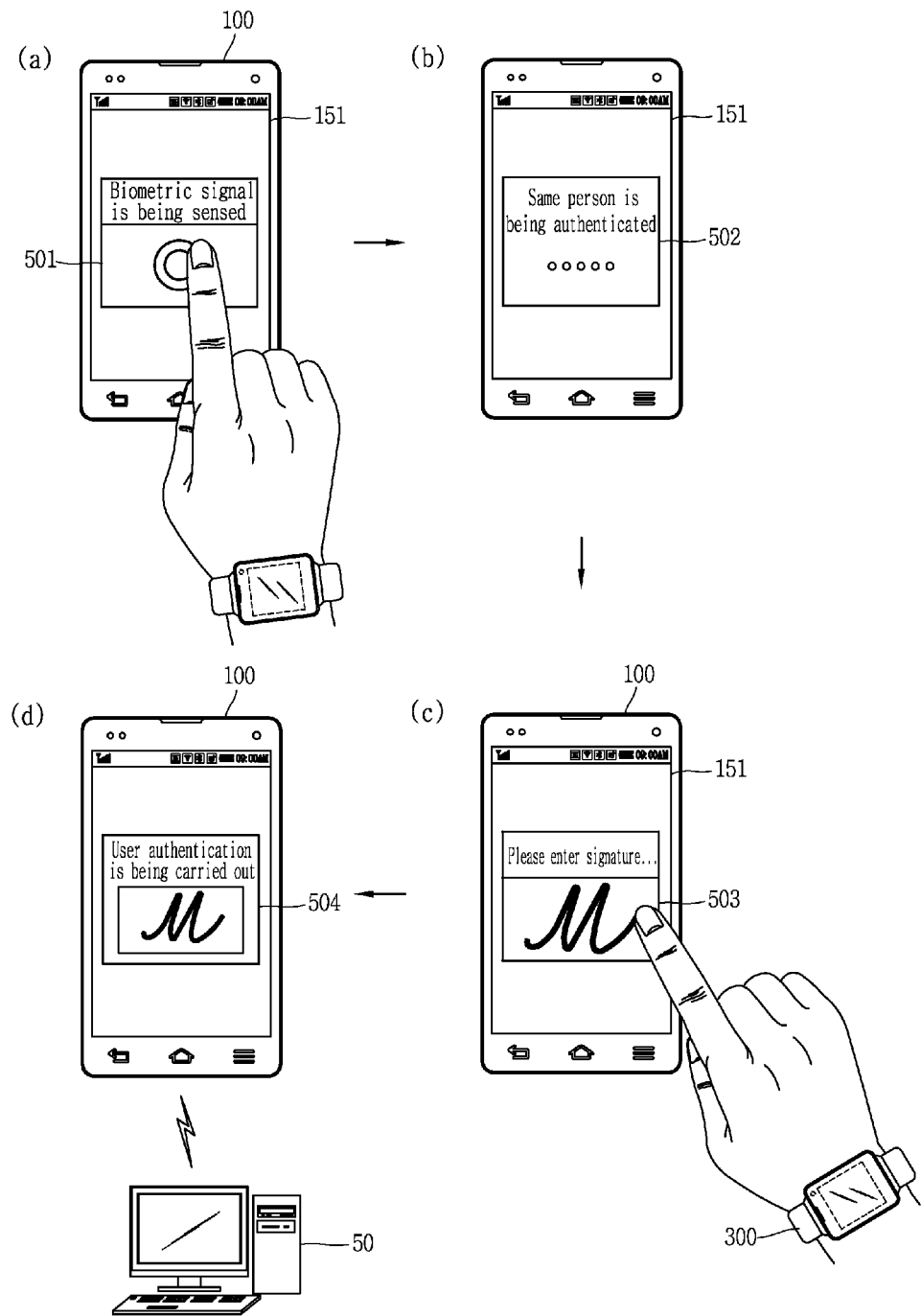

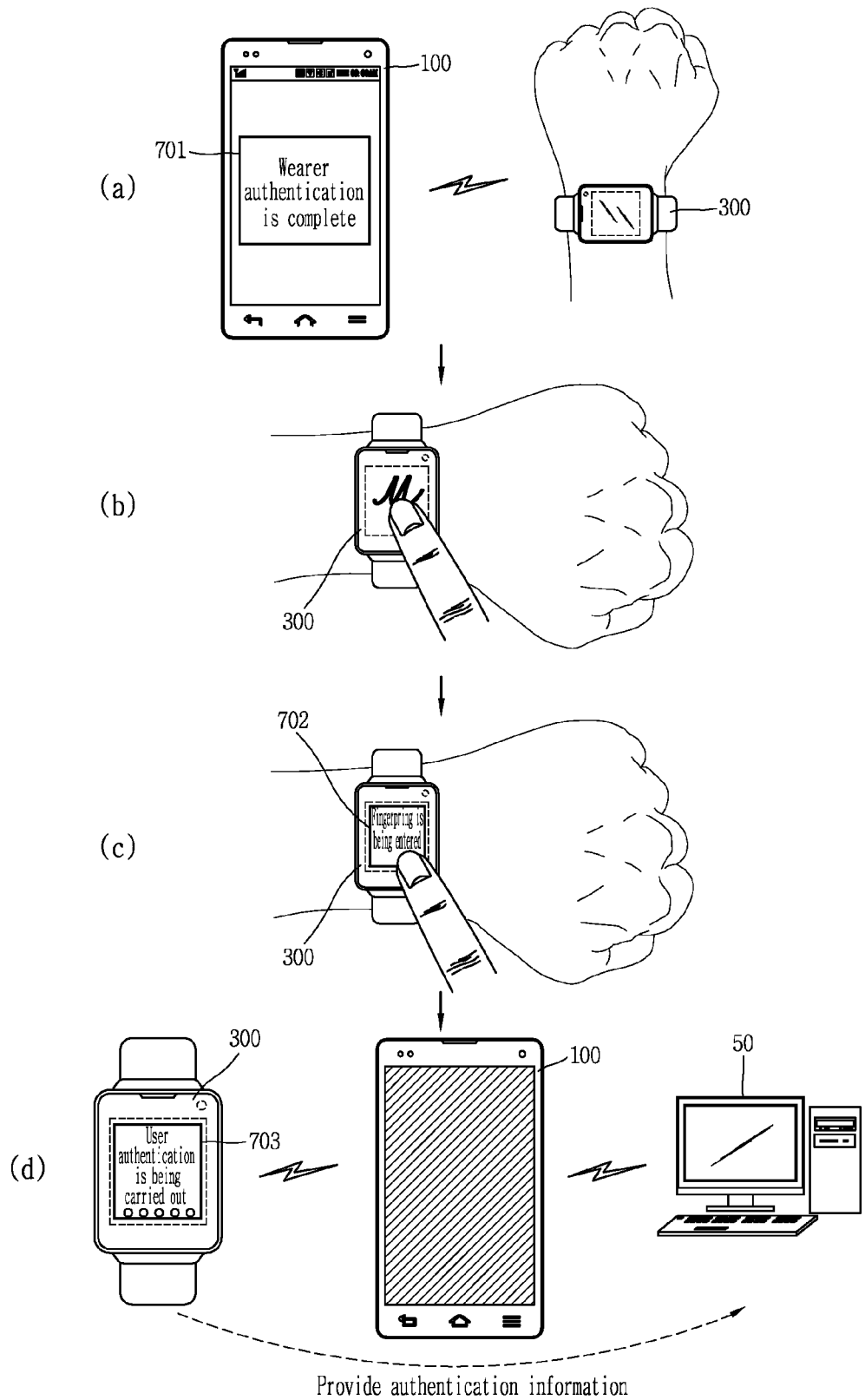

MOBILE TERMINAL AND METHOD FOR CONTROLLING THE SAME

CROSS-REFERENCE TO RELATED APPLICATIONS

This application claims priority to Korean Patent Application No. 10-2014-0037156 filed on Mar. 28, 2014 in Korea, the entire contents of which is hereby incorporated by reference in its entirety.

BACKGROUND OF THE DISCLOSURE

1. Field of the Disclosure

The present disclosure relates to a mobile terminal, and more particularly, to a mobile terminal configured to be wearable on a specific portion of a human body, and a control method thereof.

2. Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

Owing to the improvements, a mobile terminal has been evolved into various types of designs. Specifically, as the mobile terminal becomes more lightweight and compact, it is implemented to be brought into contact with a portion of a human body such as a glasses type, a clock type, a necklace type, a bracelet type, a ring type, or the like, and moreover, the forms of a mobile terminal configured to be mounted on a user's clothing have been developed.

In this manner, when a mobile terminal is mounted and used on various positions of a human body according to the user's purpose and intention, it may be possible to naturally sense the wearer's movement and biometric signals, thereby performing various functions.

SUMMARY OF THE DISCLOSURE

Accordingly, an object of the present invention is to provide a mobile terminal implemented to naturally and conveniently perform user authentication using a terminal configured to be wearable on a specific portion of a human body, and a control method thereof.

Furthermore, another object of the present invention is to provide a mobile terminal implemented to maintain security when an input for user authentication is carried out in a user's unwanted state using a terminal wearer's biometric signals, and a control method thereof.

For the purpose of this, a mobile terminal according to an embodiment of the present disclosure may include a body; a wireless communication unit configured to receive an information input request for user authentication from an external server connected to the body; and a controller configured to transmit a wireless signal for sensing the wearing of a second mobile terminal formed to be paired with the body and wearable on a specific portion of a human body to the second mobile terminal in response to the request. In addition, the controller may perform wearer authentication for the second mobile terminal in response to receiving at least one of a response signal to the wireless signal from the second mobile terminal and a wearer's biometric signal sensed through the second mobile terminal, and control the authentication method of the user authentication or processing for an information input corresponding to the authentication method to be determined in a different manner based on at least one of the execution result of the wearer authentication and the analysis result of the received biometric signal.

Furthermore, according to an embodiment, the authentication method may include at least one of a user's fingerprint authentication, face authentication, voice authentication, biometric information authentication, signature authentication, handwriting authentication, password authentication, and gesture authentication using at least one sensor provided in the body, and processing for an information input corresponding to the authentication method may be varied according to a wearer's psychological state determined by the analysis result of the biometric signal.

Furthermore, according to an embodiment, the mobile terminal may further include a display unit configured to display visual information corresponding to an input request for the user authentication, wherein the controller changes the displayed visual information such that a user interface corresponding to the determined authentication method is displayed on the display unit or the second mobile terminal when wearer authentication for the second mobile terminal is completed.

Furthermore, according to an embodiment, the controller may activate a biometric signal sensing function in response to a touch applied to one region of the display unit while the second mobile terminal is worn, and display a screen change corresponding to the activation of the biometric signal sensing function on the display unit.

Furthermore, according to an embodiment, the controller may compare a first biometric signal sensed according to the activation of the biometric signal sensing function with a second biometric signal received from the second mobile terminal, and determine whether or not they are the same person according to the comparison result.

Furthermore, according to an embodiment, the controller may analyze the received biometric signal to determine whether a wearer is awake or not and his or her psychological state, and match the received biometric signal to the prestored user information, and display a user interface corresponding to the authentication method determined based on whether they are matched or not on the display unit when the wearer is in an awake state and in a psychological state satisfying a predetermined normal condition as a result of the determination.

Furthermore, according to an embodiment, the controller may analyze the received biometric signal to determine whether a wearer is awake or not and his or her psychological state, and display a second user interface corresponding to another authentication method subsequent to displaying a first user interface corresponding to the predetermined authentication method on the displays unit or display a third user interface corresponding to an authentication method with an increased security level instead of the first user interface when the wearer is sleeping and in a psychological state satisfying a predetermined abnormal condition as a result of the determination.

Furthermore, according to an embodiment, the controller may analyze the received biometric signal to determine whether a wearer is awake or not and his or her psychological state, and display a user interface corresponding to a predetermined authentication method on the display unit, and control an interfering signal to be combined with input information received through the displayed user interface when the wearer is sleeping and in a psychological state satisfying a predetermined abnormal condition as a result of the determination.

Furthermore, according to an embodiment, the controller may suspend a process associated with user authentication and provide a warning message to the display unit or the external server when a predetermined time has passed or an input for at least one of the first and the second user interface is sensed while the wearer's psychological state satisfying a predetermined abnormal condition is out of a threshold value.

Furthermore, according to an embodiment, the controller may change the determined authentication method to perform user authentication according to an authentication method corresponding to the sensed user gesture when wearer authentication for the second mobile terminal is completed and a predetermined user gesture is sensed while the second mobile terminal is worn.

Furthermore, according to an embodiment, the controller may match a biometric signal received from the second mobile terminal to prestored user information to perform wearer authentication for the second mobile terminal, and control a predetermined authentication method to be changed or an input corresponding to another authentication method to be additionally requested when the received biometric signal is not matched to the prestored user information.

Furthermore, according to an embodiment, the controller may control the wireless communication unit such that the changed authentication or visual information associated with another authentication method is not transmitted to the second mobile terminal when the received biometric signal is not matched to the prestored user information.

Furthermore, according to an embodiment, the wireless communication unit may be configured to further perform Bluetooth low energy (BLE) communication with the second mobile terminal, and the controller may sense a separation distance between the body and the second mobile terminal according to the Bluetooth low energy (BLE) communication, and determine a device for providing an input screen corresponding to the determined authentication method based on the sensed separation distance.

Furthermore, according to an embodiment, the controller may control an input corresponding to the determined authentication method to be provided using the body and the second mobile terminal when the sensed separation distance is within a predetermined range, and control an input corresponding to the determined authentication to be provided using only either one of the body and the second mobile terminal when the sensed separation distance is out of the predetermined range.

Furthermore, according to an embodiment, the controller may display a message for guiding the wearing of the second mobile terminal when the response signal is not received or it is sensed that the second mobile terminal is not worn as a result of the reception of the response signal.

Furthermore, according to an embodiment, when a change according to the wearing or unwearing of the second mobile terminal is sensed subsequent to displaying a first user interface corresponding to the determined authentication method, the controller may change the first user interface to a second user interface corresponding to another authentication method or transmit at least part of visual information associated with the first user interface to the second mobile terminal based on the change.

Furthermore, a mobile terminal according to an embodiment of the present disclosure may include a body configured to be wearable on a specific portion of a human body; a sensing unit configured to sense the wearing of the body, and sense a biometric signal of the wearer of the body in response to an information request input for user authentication from an external server connected to the body; and a controller configured to determine whether the wearer is awake or not and his or her psychological state based on the sensed biometric signal, and control the authentication method of the user authentication or processing for an information input corresponding to the authentication method to be varied based on the determination.

Furthermore, according to an embodiment, the controller may combine a predetermined interfering signal with an information input corresponding to the authentication method when determined that the wearer is sleeping or in a psychological state satisfying a predetermined abnormal condition based on the sensed biometric signal.

Furthermore, according to an embodiment, the controller may control a predetermined authentication method to be changed or an input corresponding to another authentication method to be additionally requested when determined that the wearer is sleeping or in a psychological state satisfying a predetermined abnormal condition based on the sensed biometric signal.

Furthermore, according to an embodiment, the controller may match the sensed biometric signal to prestored user information to display the corresponding alarm, and control user authentication to be carried out with an authentication method determined according to whether they are matched or not when determined that the wearer is awake or in a psychological state satisfying a predetermined normal condition based on the sensed biometric signal.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 2A is a block diagram illustrating a mobile terminal according to an embodiment disclosed in the present disclosure;

FIG. 4 is a conceptual view for explaining the flow chart of FIG. 3;

FIG. 5 is a conceptual view for explaining a method of determining an authentication method for user authentication according to wearer authentication in an embodiment disclosed in the present disclosure;

FIG. 7 is a conceptual view for explaining a method of changing an authentication method of user authentication based on a predetermined user gesture subsequent to wearer authentication according to an embodiment disclosed in the present disclosure;

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultra books, and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
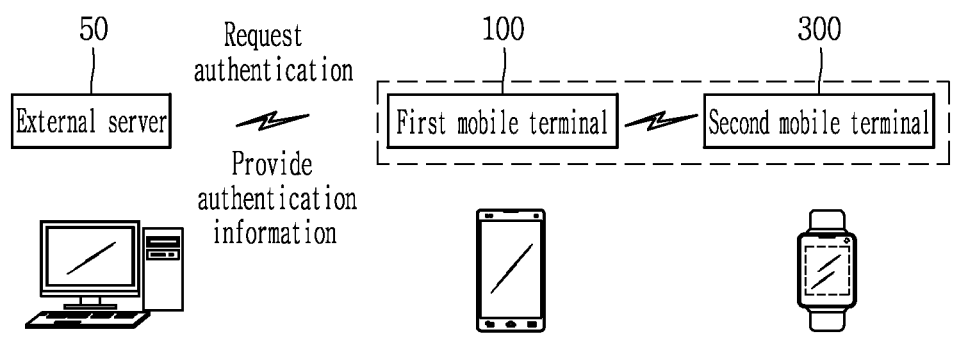
FIG. 1 is a conceptual view illustrating that a mobile terminal communicates with an external server and a second mobile terminal according to an embodiment disclosed in the present disclosure.

FIG. 1 is a conceptual view illustrating that a mobile terminal communicates with an external server and a second mobile terminal according to an embodiment disclosed in the present disclosure.

As illustrated in FIG. 1, a first mobile terminal 100 may be connected to an external server 50 to receive predetermined data from the external server 50 or process the received data and transmit it again to the external server 50. Here, the external server 50 may include a device configured to require security authentication to execute a specific function or access specific data or all electronic devices configured to be installed with such a program or provide such a service. The first mobile terminal 100 may execute an application downloaded to the first mobile terminal 100 to access the external server 50, for example.

Furthermore, in FIG. 1, the first mobile terminal 100 may be paired with a second mobile terminal 300. Here, the second mobile terminal 300 is implemented with a first mobile terminal 100 configured to be wearable on a specific portion of a human body. The first mobile terminal 100 and second mobile terminal 300 may perform wireless communication through Bluetooth communication or Wi-Fi communication. In this manner, when the first mobile terminal 100 is paired with the second mobile terminal 300, the second mobile terminal 300 may receive data provided from the external server 50 or provide data processed in the second mobile terminal 300 to the external server 50 again through the first mobile terminal 100.

In particular, according to another embodiment of the present disclosure, the first mobile terminal 100 may receive an information input request for user authentication from the external server 50 to access the external server 50 or execute a specific function or access specific data through the external server 50. Furthermore, authentication information received through the first mobile terminal 100 or the second mobile terminal 300 may be provided to the external server 50 again, thereby performing user authentication for checking that he or she is the authorized user himself or herself.

Furthermore, according to an embodiment of the present disclosure, the first mobile terminal 100 and/or the second mobile terminal 300 may sense a user's biometric signal in response to an information input request for user authentication from the external server 50. In addition, the first mobile terminal 100 may determine a suitable authentication method according to the sensed biometric signal or vary processing for authentication information received for user authentication.

For example, when primary determination is made such that the wearer is the user himself or herself through the sensed biometric signal, there is no problem in security even when user authentication is carried out by a simpler authentication method. Furthermore, for example, even when information entered for user authentication matches the information of previously registered user himself or herself, user authentication should not be carried out for the entered information if the information input is carried out in contrary to the user's intention. The embodiments associated therewith will be described below in more detail with reference to the accompanying drawings.

On the other hand, FIG. 2A is a block diagram illustrating a mobile terminal according to an embodiment disclosed in the present disclosure.

As illustrated in FIG. 2A, the mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 2A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), Long Term Evolution-Advanced (LTE-A), etc.)

The wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), High Speed Uplink Packet Access (HSUPA), Long Term Evolution (LTE), Long Term Evolution-Advanced (LTE-A), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks. The short-range wireless communication network may be wireless personal area networks.

Here, the another mobile terminal 100 may be a wearable device, for example, a smart watch, a smart glass or a head mounted display (HMD), which is able to exchange data with the mobile terminal 100 (or to cooperate with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. According to the requirement, the location information module 115 may perform any function of the other modules of the wireless communication unit 110 to obtain data on the location of the mobile terminal in a substitutable or additional manner. The location information module 115 is a module used to acquire the location (or current location) of the mobile terminal, but will not be necessarily limited to a module for directly calculating or acquiring the location of the mobile terminal.

Next, the input unit 120 will be described in more detail. The input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

On the other hand, the sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

On the other hand, the camera 121 constructing the input unit 120 may include at least one of a camera sensor (for example, CCD, CMOS, etc.), a photo sensor (or image sensor) and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

Furthermore, the display unit 151 may also be implemented as a stereoscopic display unit for displaying stereoscopic images.

The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

On the other hand, the identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

Furthermore, when the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

Furthermore, as described above, the controller 180 may typically control the general operations of the mobile terminal 100. For example, the controller 180 may set or release a lock state for restricting a user from inputting a control command with respect to applications when a status of the mobile terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

On the other hand, various embodiments described herein may be implemented in a computer-readable or its similar medium using, for example, software, hardware, or any combination thereof.

Figure 2B:
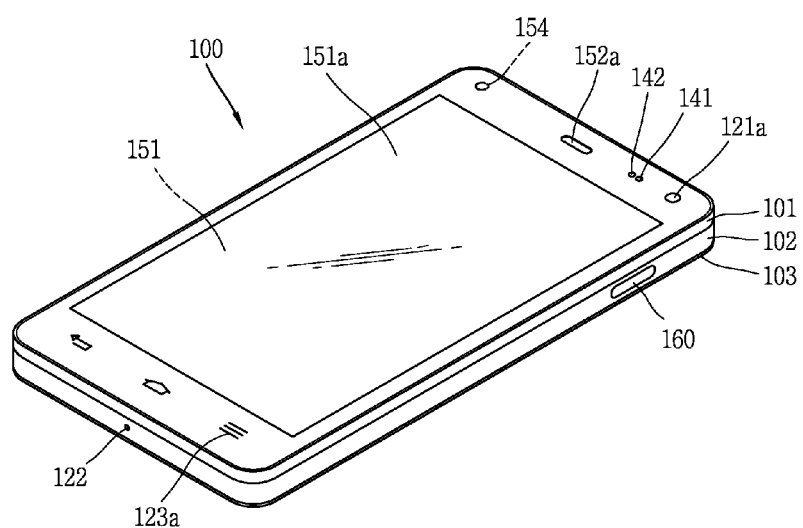
FIGS. 2B and 2C are conceptual views illustrating one example of the mobile terminal, viewed from different directions according to an embodiment disclosed in the present disclosure.
Figure 2C:
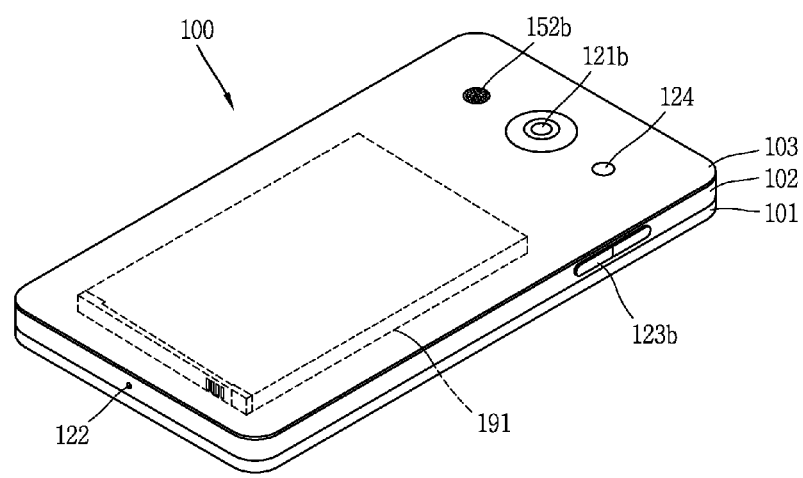

Referring to FIGS. 2B and 2C, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The description of a specific type of mobile terminal may be generally applicable to another type of mobile terminal.

Here, the terminal body may be understood as a conception which indicates the mobile terminal 100 as at least one assembly.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 2B and 2C.

However, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

Furthermore, the display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

On the other hand, the touch sensor may be configured in a form of film having a touch pattern. The touch sensor may be a metal wire, which is disposed between the window 151a and a display (not shown) on a rear surface of the window 151a or patterned directly on the rear surface of the window 151a. Or, the touch sensor may be integrally formed with the display. For example, the touch sensor may be disposed on a substrate of the display or within the display.

In this manner, the display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151*a* and the front case 101). In this case, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121*a* may process video frames such as still or moving images obtained by the image sensor in a video call mode or a capture mode. The processed video frames may be displayed on the display unit 151 or stored in the memory 170.

The first and second manipulation units 123*a* and 123*b* are examples of the user input unit 123, which may be manipulated by a user to input a command for controlling the operation of the mobile terminal 100. The first and second manipulation units 123*a* and 123*b* may also be commonly referred to as a manipulating portion, and may employ any method if it is a tactile manner allowing the user to perform manipulation with a tactile feeling such as touch, push, scroll or the like. Furthermore, the first and the second manipulation units 123*a* and 123*b* may be employed as a method of manipulating with no user's tactile feeling through a proximity touch, a hovering touch or the like.

The drawings are illustrated on the basis that the first manipulation unit 123*a* is a touch key, but the present disclosure may not be necessarily limited to this. For example, the first manipulation unit 123*a* may be configured with a mechanical key, or a combination of a touch key and a push key.

The content received by the first and second manipulation units 123*a* and 123*b* may be set in various ways. For example, the first manipulation unit 123*a* may be used by the user to input a command such as menu, home key, cancel, search, or the like, and the second manipulation unit 123*b* may be used by the user to input a command, such as controlling a volume level being output from the first or second audio output module 152*a* or 152*b*, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152*a* or 152*b*, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123*a* located on the front surface of the terminal body. Accordingly, when the first manipulation unit 123*a* is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* may be further mounted to the rear surface of the terminal body. The second camera 121*b* may have an image capturing direction, which is substantially opposite to the direction of the first camera unit 121*a*.

The second camera 121*b* may include a plurality of lenses arranged along at least one line. The plurality of lenses may also be arranged in a matrix configuration. The cameras may be referred to as an 'array camera.' When the second camera 121*b* is implemented as the array camera, images may be captured in various manners using the plurality of lenses and images with better qualities may be obtained.

A flash 124 may be disposed adjacent to the second camera 121*b*. When an image of a subject is captured with the camera 121*b*, the flash 124 may illuminate the subject.

The second audio output module 152*b* may further be disposed on the terminal body. The second audio output module 152*b* may implement stereophonic sound functions in conjunction with the first audio output module 152*a*, and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 2A) may be retractable into the terminal body. Alternatively, an antenna may be formed in a form of film to be attached onto an inner surface of the rear cover 103 or a case including a conductive material may serve as an antenna.

A power supply unit 190 (see FIG. 2A) for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

On the other hand, a mobile terminal may extend to a wearable device which is wearable on a human body, going beyond usually using the mobile terminal by a user with grabbing it with a hand. Examples of the wearable device may include a smart watch, a smart glass, a head mounted display (HMD), and so on. Hereinafter, description will be given of examples of a mobile terminal extending to the wearable device.

A wearable device may exchange data with (or cooperate with) another mobile terminal 100. The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

Figure 2D:
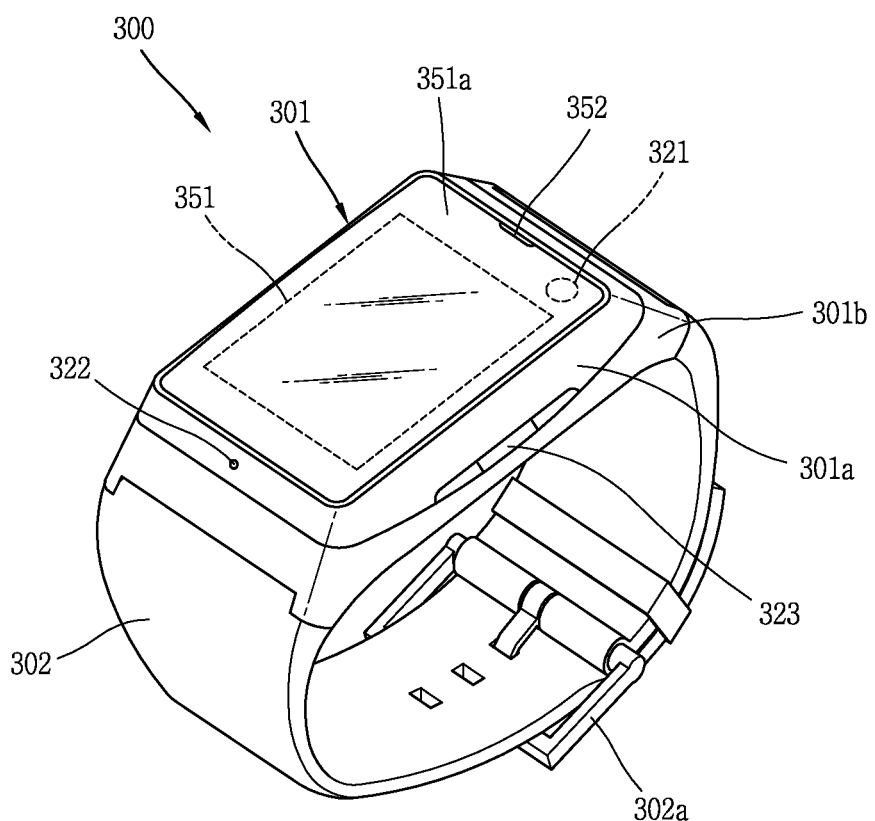
FIG. 2D is a conceptual view illustrating one example of a second mobile terminal configured to be paired with a mobile terminal and wearable on a specific portion of a human body according to an embodiment disclosed in the present disclosure.

Regarding this, FIG. 2D is a conceptual view illustrating one example of a second mobile terminal configured to be paired with a mobile terminal and wearable on a specific portion of a human body according to an embodiment disclosed in the present disclosure.

Referring to FIG. 2D, the watch type mobile terminal 300 may include a main body 301 with a display unit 351, and a band 302 connected to the main body 301 to be wearable on a wrist. In general, the mobile terminal 300 may include the characteristics of the first mobile terminal 100 in FIGS. 1A through 1C or similar characteristics thereto.

The main body 301 may include a case defining an appearance. As illustrated, the case may include a first case 301a and a second case 301b cooperatively defining an inner space for accommodating various electronic components. However, the present disclosure may not be limited to this. One case may be configured to define the inner space, thereby implementing a mobile terminal 300 with a uni-body.

The watch type mobile terminal 300 may be allowed to perform wireless communication, and an antenna for the wireless communication may be installed in the main body 301. The antenna may extend its function using a case. For example, a case including a conductive material may be electrically connected to the antenna so as to extend a ground area or a radiation area.

The display unit 351 may be disposed on a front surface of the main body 301 to output information thereon. The display unit 351 may be provided with a touch sensor so as to implement a touch screen. As illustrated, a window 351a of the display unit 351 may be mounted onto the first case 301a to form a front surface of the terminal body together with the first case 301a.

An audio output module 352, a camera 321, a microphone 322, a user input unit 323 and the like may be disposed on the main body 301. When the display unit 351 is implemented as the touch screen, it may function as the user input unit 323, which may result in excluding a separate key on the main body 301.

The band 302 may be worn on the wrist in a surrounding manner. The band 302 may be made of a flexible material for facilitating the wearing. As one example, the band 302 may be made of fur, rubber, silicon, synthetic resin or the like. The band 302 may also be configured to be detachable from the main body 301. Accordingly, the band 302 may be replaceable with various types of bands according to a user's preference.

On the other hand, the band 302 may be used for extending the performance of the antenna. For example, the band may include therein a ground extending portion (not shown) electrically connected to the antenna to extend a ground area.

The band 302 may be provided with a fastener 302a. The fastener 302a may be implemented into a buckle type, a snap-fit hook structure, a Velcro type, or the like, and include a flexible section or material. The drawing illustrates an example that the fastener 302a is implemented into the buckle type.

Hereinafter, preferred embodiments related to a control method which can be implemented in the mobile terminal will be explained in more detail with reference to the attached drawings. It is obvious to those skilled in the art that the present features can be embodied in several forms without departing from the characteristics thereof.

A mobile terminal 100 (hereinafter, referred to as a "first mobile terminal") including at least one of the foregoing constituent elements according to an embodiment of the present disclosure may receive an information input request for user authentication from an external server 50 connected to the body thereof through the wireless communication unit 110. Furthermore, a wireless signal for sensing the recognition and wearing of the second mobile terminal 300 configured to be paired with the mobile terminal 100 and wearable on a specific portion of a human body may be transmitted to the second mobile terminal 300 in response to the request.

The second mobile terminal 300 transmits a response signal with respect to a wireless signal transmitted from the first mobile terminal 100 or a wearer's biometric signal sensed through a sensor provided in the second mobile terminal 300 to the first mobile terminal 100. Then, the first mobile terminal 100 may perform recognition and wearer authentication on the second mobile terminal 300 based on the received response signal or biometric signal. For example, when the second mobile terminal 300 is recognized to receive a biometric signal, the received biometric signal may be compared with a previously registered (or prestored) biometric signal to determine whether the wearer of the second mobile terminal 300 is the same person as the user himself or herself of the first mobile terminal 100, thereby performing wearer authentication.

In addition, the first mobile terminal 100 may determine a suitable authentication method or determine processing for an information input corresponding to the presented authentication method to be varied based on at least one of the execution result of wearer authentication the analysis result of the biometric signal received from the second mobile terminal 300.

For example, the first mobile terminal 100 may be implemented to present a different authentication method according to whether or not the wearer of the second mobile terminal 300 is the user himself or herself of the first mobile terminal 100 as a result of wearer authentication. For a specific example, when the wearer of the second mobile terminal 300 is the user himself or herself of the first mobile terminal 100, it is regarded that primary determination for user authentication has been carried out, thereby selecting and presenting an authentication method with higher convenience of information input than security, for example, a handwriting authentication method. On the contrary, when the wearer of the second mobile terminal 300 is not the user himself or herself of the first mobile terminal 100, it may be possible to select and present an authentication method with higher security, for example, a plurality of authentication methods such a fingerprint authentication method, an iris and retina authentication method, and the like.

Furthermore, for example, even when confirmed that the wearer of the second mobile terminal 300 is the user himself or herself of the first mobile terminal 100 as a result of the wearer authentication, the first mobile terminal 100 may receive and analyze a wearer's biometric signal from the second mobile terminal 300 to control processing of an information input for the presented authentication method to be varied according to whether the wearer is awake or not and his or her psychological state. For example, when determined that the wearer is in a threatening, intimidating or sleeping state according to the analysis of the wearer's biometric signal, it may be possible to perform a process for disallowing authentication processing to be carried out in actuality even if there is an information input matched to previously registered user information.

Here, user authentication denotes authenticating the fact that the user is an authorized himself or herself with the use of an authentication protocol using a password or the like. In other words, it denotes software for checking whether or not a user who accesses the external server 50 or wants to access specific data through the external server 50 is an authorized valid user with a reliable method.

There are a lot of various authentication methods for user authentication. The authentication method may be largely classified into a knowledge-based authentication method, an ownership-based authentication method, and a feature-based authentication method.

Specifically, the knowledge-based authentication method is a method for authenticating that the user is himself or herself according to the person's knowledge, and the examples thereof may include an ID/password authentication method, a passphrase authentication method, a previously registered question and answer authentication method, an i-pin authentication method, and the like. According to the knowledge-based authentication method, since a user sets up a password according to his or her habit, it is advantageous in terms of convenience though being easily inferred with relatively low security.

The ownership-based authentication method is a method for directly presenting specific information contained in his or her possessed separate medium to authenticate that the user is himself or herself, and the examples thereof may include an OPT authentication method, a security card authentication method, a certificate authentication method, a HSM authentication method, and the like. According to the ownership-based authentication method, there is a fear of the loss of the medium or a possibility of leakage due to malicious codes.

The feature-based authentication method is a method for authenticating that the user is himself or herself using the user's physical or behavioral features, and the examples thereof may include a fingerprint authentication method, an iris or retina authentication method, a hand shape authentication method, a face authentication method, a voice authentication method, and a signature authentication method. According to the feature-based authentication method, it is advantageous in terms of convenience, high reliability and stability, but has difficulty in recognition when his or her body is injured.

Furthermore, biometric signal denotes an electrical signal generated from the body of a wearer who wears the second mobile terminal 300. For example, the biometric signal may be any one of an electrocardiogram (ECG) signal, photoplethymogram (PPG) signal or a galvanic skin response (GSR) signal, but may not be necessarily limited to this, and may all include various types of signals widely used in the related art.

More specifically, electrical key indices generated from a wearer's body may include electroencephalogram, electrocardiogram, electromyogram, ocular electrical conductivity, and galvanic skin response, and physical key indices may include blood pressure, heart rate, arrhythmia, stroke quotient, dropped beat, body temperature, respiratory rate, and the like. At least one or more such electrical and physical key indices may be sensed through a sensor provided in the second mobile terminal 300.

Specifically, electrocardiogram (ECG) signal is an electrical signal in which the electrical activity of heart is generated from the surface of skin. The electrocardiogram signal may be measured by inducing an action current generated from cardiac muscle according to heartbeat to suitable two places of the body surface.

Electromyogram (EMG) signal is an electrical signal in which muscular contractility, muscular activity and fatigue are generated from the surface of skin. Electromyogram may sense the movement of tendons according to the movement of a wearer's finger sensed through the wearing of a watch type second mobile terminal 300. Specifically, finger flexor tendons in charge of the movement of each finger exist in a carpal tunnel within a terminal wearer's wrist. There are nine tendons and one nerve in the finger flexor tendons, and nine tendons contained in the finger flexor tendons move in various combinations thereof when moving his or her finger. The sensing unit 140 of the mobile terminal may sense the configuration of tendons deformed according to the movement of his or her finger or wrist, and the controller 180 may determine which type of gesture has been taken by his or her fingers based on the sensed information.

Electroencephalogram (EEG) signal is an electrical signal in which brain activity to concentration or external stimuli is generated from the surface of skin. The electroencephalogram signal may be measured by inducing a potential variation generated on human cerebral cortex or a brain current generated thereby on the scalp surface.

Galvanic skin response (GSR) signal is an electrical signal in which a change of skin resistance to sympathetic nerve activity is generated from the surface of skin. The galvanic skin response signal may be acquired by measuring a phenomenon in which an electrical resistance generated by external stimuli or emotional excitement is temporarily reduced or an action potential is generated from the skin of a living body.

On the other hand, it is illustrated herein as an example that a wearer's biometric signal sensed through the second mobile terminal 300 is transmitted to the first mobile terminal 100, but may not be necessarily limited to this, and may be also implemented in a such manner that a biometric signal sensed according to the user's contact (for example, when a touch is applied to the display unit 151 using his or her finger) is directly provided through a sensor provided in the first mobile terminal 100.

Figure 3:
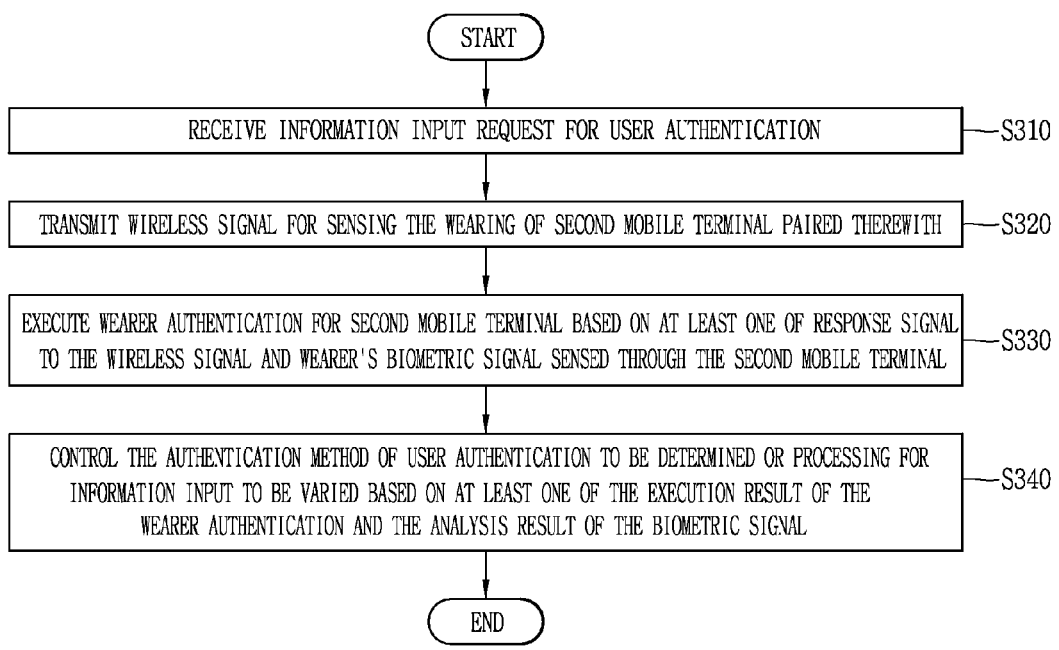
FIG. 3 is a flow chart for explaining a control method of a mobile terminal according to an embodiment disclosed in the present disclosure.

Hereinafter, a control method of a mobile terminal according to an embodiment disclosed in the present disclosure will be described with reference to FIGS. 3 and 4. FIG. 3 is a flow chart for explaining a control method of a mobile terminal according to an embodiment disclosed in the present disclosure, and FIG. 4 is a conceptual view for explaining the flow chart of FIG. 3.

Referring to FIG. 3, first, the process of allowing the first mobile terminal 100 to receive an information input request for user authentication from the external server 50 (see FIG. 1) connected to the first mobile terminal 100 through the wireless communication unit 110 is carried out (S310).

Here, the external server 50 may include a device for communicating with the first mobile terminal 100 in a wireless manner to execute a specific function or requesting security authentication to access specific data or all terminals in the form of being installed with such a program or providing such a service. Furthermore, the external server 50 may perform an operation in cooperation with database (not shown) stored with user information matching the user authentication.

Furthermore, user authentication denotes authenticating the fact that the user is an authorized himself or herself with the use of an authentication protocol using a password or the like, and an information input for user authentication denotes entering information matching previously registered authentication information to process the user authentication.

Specifically, when the first mobile terminal 100 transmits a request signal for accessing the external server 50 according to the execution of a specific application, an information input request for user authentication may be received from the external server 50. Otherwise, when the first mobile terminal 100 executes a specific function of the accessed external server 50 or transmits a request signal for accessing specific data, an information input request for user authentication may be received from the external server 50.

In this manner, when an information input request for user authentication is received from the external server 50, screen information corresponding to the information input request may be displayed on the display unit 151 of the first mobile terminal 100 as illustrated in FIG. 4A. For example, a message 401 for guiding the start of a process such as "user authentication process is started" may be displayed. Meanwhile, though not shown in the drawing, upon receiving the information input request, a user interface capable of entering an ID/password may be immediately popped up on the display unit 151.

The first mobile terminal 100 transmits a wireless signal for sensing the wearing of the second mobile terminal 300 (see FIG. 1) configured to be paired with the body and wearable on a specific portion of a human body in response to the received information input request (S320).

Here, the second mobile terminal 300 has been implemented in the form of a watch type mobile terminal configured to be wearable on a user's wrist, but may be also implemented with a band type mobile terminal configured to be wearable on a user's forearm or a glass type mobile terminal configured to be wearable on a user's head.

Subsequently, when a response signal to the wireless signal is received and/or a biometric signal sensed through the second mobile terminal 300 is received from the second mobile terminal 300, the first mobile terminal 100 performs wearer authentication for the second mobile terminal 300 (S330).

Here, wearer authentication denotes checking whether the second mobile terminal 300 is worn or not and whether or not the wearer of the second mobile terminal 300 matches the user of the first mobile terminal 100. To this end, the second mobile terminal 300 may include at least one sensor for sensing the wearer's biometric signal, for example, a PPG sensor, a GSR sensor, a SKT sensor, and the like. Furthermore, a sensor provided in the second mobile terminal 300 may be implemented to be activated upon receiving a wireless signal from the first mobile terminal 100 to collect the wearer's biometric signal in real time.

Here, biometric signal is an electrical signal generated from the body of a wearer who wears the second mobile terminal 300, and for example, the biometric signal may be any one of an electrocardiogram (ECG) signal, photoplethymogram (PPG) signal or a galvanic skin response (GSR) signal, but may not be necessarily limited to this, and may all include various types of signals widely used in the related art.

As a result of the execution of wearer authentication, the first mobile terminal 100 may sense a relative location of the second mobile terminal 300 and whether it is worn or not.

Furthermore, as a result of the execution of wearer authentication, the first mobile terminal 100 compare the received biometric signal with a biometric signal contained in the previously registered user information to determine whether or not the wearer of the second mobile terminal 300 is the user himself or herself of the first mobile terminal 100.

Here, the biometric signal of the previously registered user information may be stored in the form of a general pattern generated based on information that has been accumulated for a predetermined period of time, and/or stored in the form of a specific pattern in which a biometric signal generated in a specific condition (for example, sleeping state, under exercise) has been recorded. Furthermore, the biometric signal of the previously registered user information may be updated for each predetermined period.

On the other hand, when wearer authentication for the second mobile terminal 300 is completed, the first mobile terminal 100 may recognize that primary determination for user authentication has been carried out. In other words, when the second mobile terminal 300 is worn, it is possible to check whether or not the wearer is the same as the user of the first mobile terminal 100. Furthermore, since the first and the second mobile terminal 100, 300 should exist within a predetermined distance for pairing, it is possible to check whether or not the user possesses both devices.

When wearer authentication for the second mobile terminal 300 is completed, the controller 180 of the first mobile terminal 100 may allow a user interface corresponding to the determined authentication method to be displayed on the display unit 151 of the body 100 or on the display unit 351 of the second mobile terminal 300 based on this.

For example, as a result of the execution of wearer authentication, screen information corresponding to the execution result of wearer authentication may be displayed on the display unit 151 of the first mobile terminal 100 as illustrated in FIG. 4B. For example, a guide message 402 such as "wearer authentication is completed" may be displayed. Furthermore, though not shown in the drawing, when wearer authentication is completed, a sound effect (for example, "beep" sound) will be output from at least one of the first and the second mobile terminal 100, 300.

Subsequently, the first mobile terminal 100 may control the authentication method of the user authentication to be determined or processing for an information input corresponding to the presented authentication method to be carried out in a different manner based on at least one of the foregoing execution result of the wearer authentication and the analysis result of the biometric signal (S340).

Specifically, as a result of the execution of wearer authentication, when confirmed that the user himself or herself of the first mobile terminal 100 is the same as the wearer of the second mobile terminal 300, a user interface corresponding to an authentication method with high user convenience may be displayed since it passes a primary authentication process. On the contrary, as a result of the execution of wearer authentication, when the first mobile terminal 100 is different from the second mobile terminal 300, a user interface corresponding to a predetermined authentication method or an authentication method with higher security may be displayed. In other words, it is possible to control an authentication method with a more convenient user input to be selected when the primary authentication has been successful, and control an authentication method with enhanced security to be selected.

To this end, the first mobile terminal 100 may provide a primary authentication result to the external server 50 or provide information associated with an authentication method (or a plurality of selectable authentication methods) selected according to the primary authentication result to the external server 50. In addition, the external server 50 may transmit a user interface corresponding to an authentication method selected according to the received information to the first mobile terminal 100 or second mobile terminal 300.

For example, when confirmed that the user of the first mobile terminal 100 is the same as the wearer of the second mobile terminal 300 in FIG. 4B, a user interface screen 403 corresponding to a fingerprint authentication method may be displayed on the display unit 151 of the first mobile terminal 100 as illustrated in FIG. 4C. Meanwhile, though not shown in the drawing, when determined that the wearer of the second mobile terminal 300 is not the user himself or herself of the first mobile terminal 100 in FIG. 4B, a user interface screen corresponding to an authentication method with high security, for example, an iris and retina authentication method, may be displayed.

Furthermore, the first mobile terminal 100 may analyze a biometric signal received from the second mobile terminal 300, and perform processing for an information input corresponding to the presented authentication method to be varied based on the analysis result.

To this end, the first mobile terminal 100 may analyze a biometric signal received from the second mobile terminal 300 to determine a wearer's status, for example, whether the wearer is awake or not and his or her psychological state. In addition, the first mobile terminal 100 may control the processing of an information input for a user interface corresponding to the presented authentication method to be varied according to the determined wearer's current status. For example, when the determined wearer's current status is recognized to be sleeping, or in a coercive, intimidated, stress state, the information input is regarded to be carried out contrary to the user's intention, it may be implemented not to actually perform an authentication process for the information input or present another authentication method.

For example, as illustrated in FIG. 4C, even if fingerprint information entered on a user interface screen 403 corresponding to the fingerprint authentication method displayed on the display unit 151 of the first mobile terminal 100 is the user himself or herself, user authentication by the external server 50 may not be carried out in FIG. 4D when the user's psychological state is determined to be abnormal (for example, excessively excited, nervous) or sleeping as a result of the analysis of the biometric signal sensed through the second mobile terminal 300. On the contrary, when the user's psychological state is normal (for example, when a stress index or the like is varied within a normal range as a result of the analysis of the biometric signal) and in an awake state as a result of the analysis of the biometric signal sensed through the second mobile terminal 300 while entering fingerprint information on the displayed user interface screen 403 in FIG. 4C, the entered fingerprint information is transmitted to the external server 50 as it is.

On the other hand, as a result of the foregoing primary determination, when a response signal is not received from the second mobile terminal 300 or the second mobile terminal 300 is sensed not to be worn, a sensor provided in the first mobile terminal 100 may be activated to sense the user's biometric signal. In this case, the first mobile terminal may analyze a biometric signal sensed through the first mobile terminal 100 to determine whether the user is awake or not and his or her psychological state. Then, the first mobile terminal may determine processing for an information input corresponding to the presented authentication method to be varied based on the determined information.

In this manner, authentication information received through the first mobile terminal 100 and/or second mobile terminal 300 may be transmitted to the external server 50 to perform a matching process for user authentication. Accordingly, secondary authentication for user authentication is carried out in the external server 50 or a server (not shown) in cooperation with the external server 50.

Furthermore, screen information indicating that user authentication is being carried out, for example, a message 404 "user authentication is being carried out", may be displayed on the display unit 151 of the first mobile terminal 100 while performing the secondary authentication as illustrated in FIG. 4D.

As described above, according to the embodiments of the present disclosure, a different authentication method may be provided according to whether a terminal configured to be wearable on a specific portion of a human body is worn or not and whether it is worn by the user himself or herself or not, thereby promoting the user's convenience. Furthermore, a terminal wearer's biometric signal may be sensed while entering information for user authentication to determine whether the wearer is awake or not and his or her psychological state, thereby preventing user authentication from being carried out in a user's unwanted state. Accordingly, it may be possible to perform user authentication with enhanced security in terms of quality.

FIG. 5 is a conceptual view for explaining a method of determining an authentication method for user authentication according to wearer authentication for the second mobile terminal 300 (see FIG. 1) in an embodiment disclosed in the present disclosure.

According to an embodiment of the present disclosure, an authentication method for user authentication may include at least one of a user's fingerprint authentication, face authentication, voice authentication, biometric information authentication, signature authentication, handwriting authentication, password authentication, and gesture authentication using a sensor provided in at least one of the first mobile terminal 100 and second mobile terminal 300. Furthermore, according to an embodiment of the present disclosure, a plurality of authentication methods may be selected for user authentication.

Furthermore, according to an embodiment of the present disclosure, processing for an information input corresponding to the presented authentication method may be varied according to the wearer's psychological state determined as a result of the analysis of the biometric signal of the first mobile terminal 100. To this end, the first mobile terminal 100 may receive the wearer's biometric signal from the second mobile terminal 300.

On the other hand, as a result of the foregoing primary authentication, when the second mobile terminal 300 is not worn or the wearer of the second mobile terminal 300 does not match the user of the first mobile terminal 100, it may be possible to sense the user's biometric signal through a sensor provided in the first mobile terminal 100.

Furthermore, the first mobile terminal 100 may sense a specific portion of a wearer's body (for example, a wearer's hand) brought into contact with the display unit 151 of the first mobile terminal 100 while the second mobile terminal 300 is worn to determine whether or not the wearer of the second mobile terminal 300 is the same as the performer of a touch applied to the display unit 151 of the first mobile terminal 100, and whether or not the wearer of the second mobile terminal 300 matches the user himself or herself. In this case, it may be more clearly confirmed whether or not the user possess the first mobile terminal 100 and second mobile terminal 300 at the same time or whether or not they are the same person.

Specifically, the controller 180 of the first mobile terminal 100 may activate a biometric signal sensing function in response to a touch applied to one region of the display unit 151 of the first mobile terminal 100 while the second mobile terminal 300 is worn. Furthermore, the controller 180 may control the display unit 151 to show a screen change corresponding to the activation of the biometric signal sensing function.

For example, when the wearer of a watch type second mobile terminal 300 applies a touch to a bar shaped display unit 151 of the first mobile terminal 100 paired therewith using his or her hand at the side where the second mobile terminal 300 is worn, screen information showing that biometric signal is being sensed, for example, text and an image 501, may be displayed on the display unit 151 as illustrated in FIG. 5A.

Then, the controller 180 of the first mobile terminal 100 compares a first biometric signal sensed according to the activation of the biometric signal sensing function with a second biometric signal received from the second mobile terminal 300 to determine whether or not they are the same person. Accordingly, screen information 502 indicating that it is being authenticated that they are the same person may be displayed on the display unit 151 as illustrated in FIG. 5B.

Furthermore, at the same time, the controller 180 may analyze the received or sensed biometric signal to determine whether the wearer is awake or not and his or her psychological state. As a result of the determination, when the wearer of the flexible display panel 200 is awake and in a psychological state satisfying a predetermined normal condition, the controller 180 matches the received or sensed biometric signal to user information prestored in the first mobile terminal 100, a user interface corresponding to an authentication method determined according to whether they are matched or not may be displayed on the display unit 151.

The process of determining whether the wearer is awake or not based on a biometric signal denotes determining whether the user is in a non-REM (NREM) state or in a REM sleep state which is a sleep state that can be easily awaken or in an already got up state (i.e., awake state) based on the wearer's biometric signal (for example, pulse signal, electrocardiogram signal, etc.). To this end, the first mobile terminal 100 may store an algorithm for determining a sleep state in the memory 160. Furthermore, the controller 180 may set up in advance a boundary value of the algorithm for determining whether he or she is in a sleeping or awaken state based on the biometric signal.

Furthermore, here, psychological state satisfying a predetermined normal condition denotes the case of sensing only a stimulation signal less than a predetermined threshold value or satisfying a condition where the wearer's stress index, exciting index, or the like corresponding to a change of biometric signal is less than a predetermined threshold value.

On the other hand, when it is unclear whether or not a psychological state determined by the analysis of the biometric signal satisfies a normal condition, data received through another sensor provided in the first mobile terminal 100 or second mobile terminal 300 may be used as auxiliary data for determining the wearer's psychological state. For example, when a wearer's stress index corresponding to a change of biometric signal is around a threshold value, a camera 321 provided in the second mobile terminal 300 may be activated to collect a wearer's facial data such as facial expression, eye blink, smile, frown, squinting, eyebrow movement, head motion, and the like, for example. The collected facial data may be transmitted to the controller 180 of the first mobile terminal 100 and used to determine a wearer's psychological state.

In this manner, when confirmed that the wearer of the second mobile terminal 300 is the same person as the user of the first mobile terminal 100, and a current status determined by the wearer's biometric signal is sleeping and a psychological state satisfying a normal condition, an authentication method with high user convenience may be selected. For such an example, it is seen that a user interface screen 503 corresponding to a signature authentication method can be displayed as illustrated in FIG. 5C. In other word, when confirmed that the user of the first mobile terminal 100 and the wearer of the second mobile terminal 300 are the user himself or herself while they are matched, it is regarded that primary authentication has been carried out, thereby performing user authentication with a simpler authentication method. When signature information is received on the displayed user interface screen 503, the signature information received at the first mobile terminal 100 is transmitted to the external server 50 to check whether or not it matches previously registered user information. A message lower right end region 504 indicating that user authentication is being carried out may be displayed on the display unit 151 of the first mobile terminal 100 until displaying the check result.

On the other hand, when the wearer of the second mobile terminal 300 does not match the user of the first mobile terminal 100 as a result of matching a biometric signal received from the second mobile terminal 300 to prestored user information (wearer authentication), the controller 180 may control the user authentication to be carried out using an authentication method with high security.

Specifically, when the wearer of the second mobile terminal 300 does not match the user of the first mobile terminal 100, the controller 180 may control a predetermined authentication method to be changed or an input corresponding to another authentication method to be additionally requested, thereby enhancing the security level of user authentication requested from the external server 50.

Furthermore, when the wearer of the second mobile terminal 300 does not match the user of the first mobile terminal 100, the controller 180 may control visual information associated with the changed authentication method or visual information associated with another authentication method not to be transmitted to the second mobile terminal 300. In other words, when the wearer of the second mobile terminal 300 is not the user himself or herself of the first mobile terminal 100, a privacy protection mode may be automatically carried out.

Hereinafter, a method of processing a case where a current status determined by the wearer of the second mobile terminal 300 or the user of the first mobile terminal 100 is sleeping or a psychological state satisfying an abnormal condition will be described.

Figure 6A:
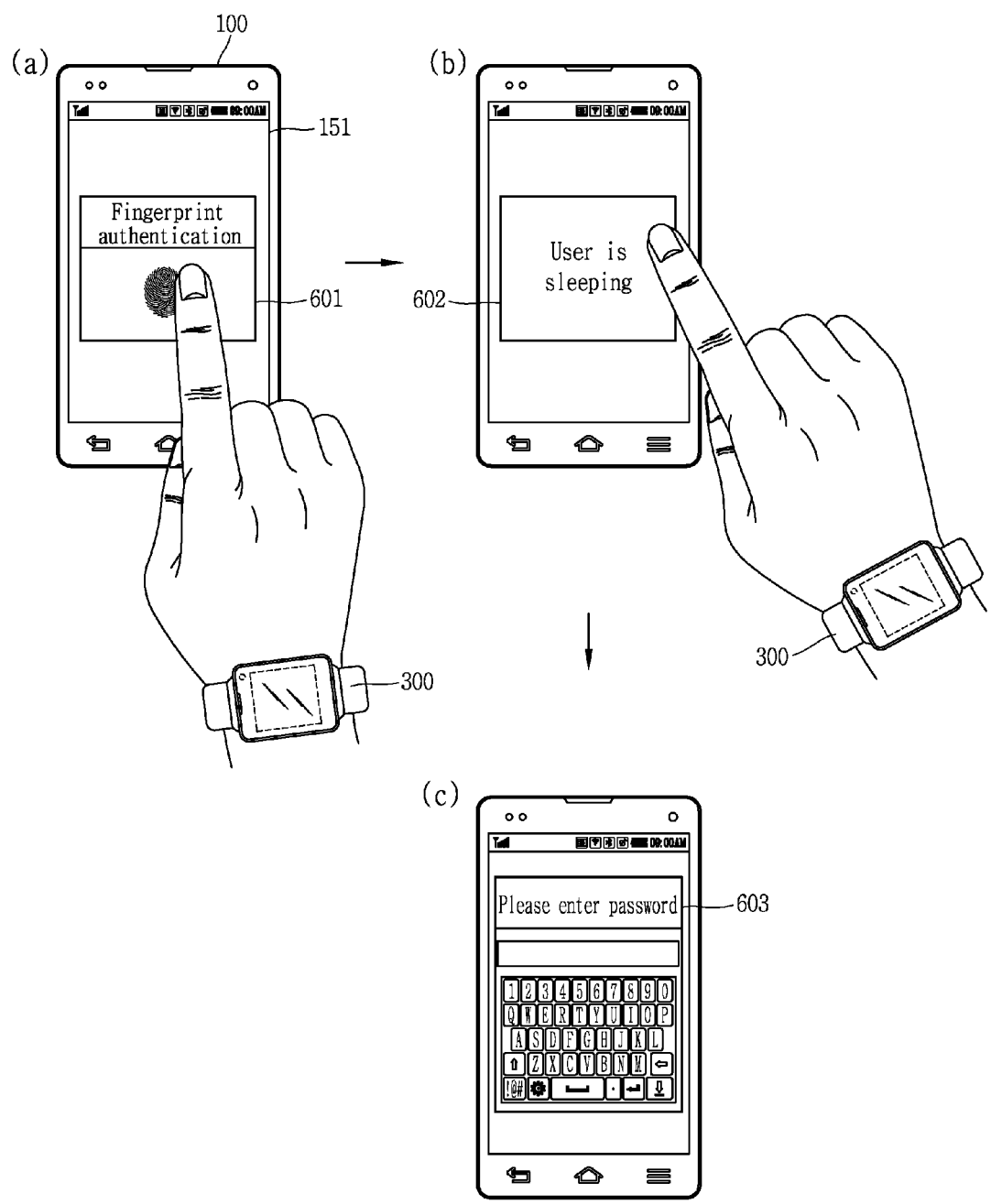
FIG. 6A is a conceptual view for explaining a method of changing an authentication method of user authentication when a terminal wearer is in a sleeping state according to an embodiment disclosed in the present disclosure.
Figure 6B:
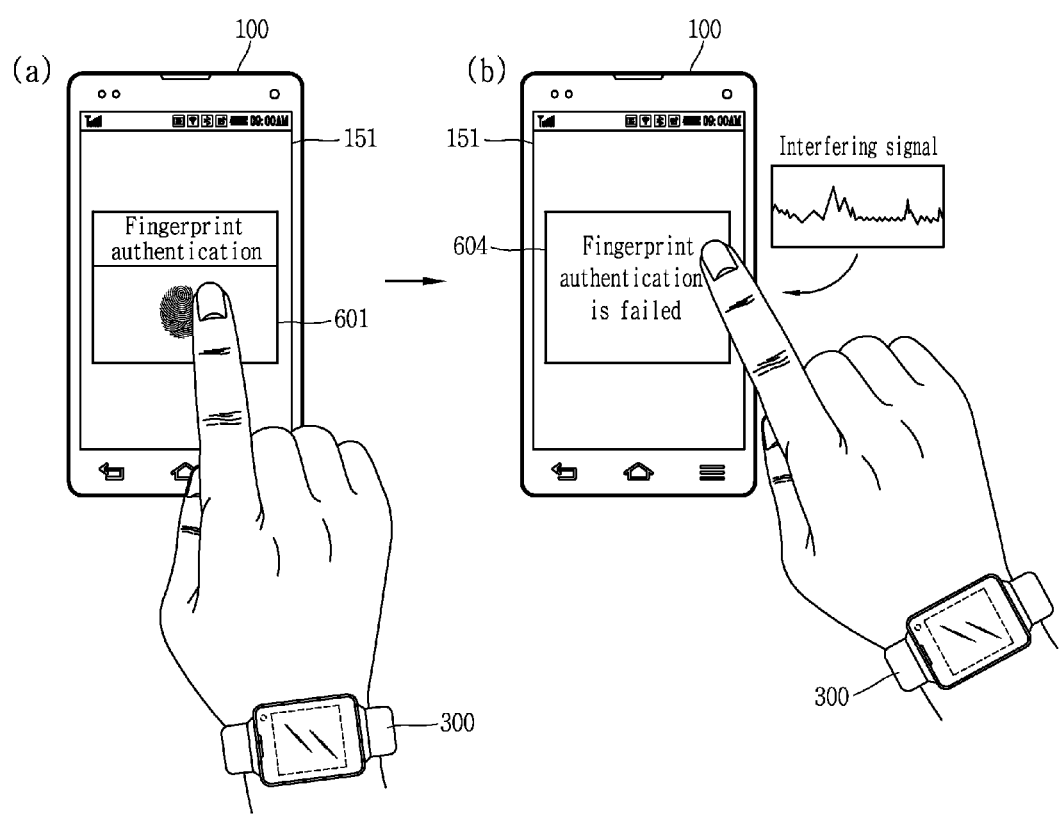
FIG. 6B is a conceptual view for explaining a method of processing an input corresponding to authentication method when a terminal wearer is in a sleeping state or his or her psychological state satisfies an abnormal condition of his according to an embodiment disclosed in the present disclosure.

Regarding this, FIG. 6A is a conceptual view for explaining a method of changing an authentication method of user authentication when a terminal wearer is in a sleeping state according to an embodiment disclosed in the present disclosure. In addition, FIG. 6B is a conceptual view for explaining a method of processing an input corresponding to authentication method when a terminal wearer is in a sleeping state or his or her psychological state satisfies an abnormal condition of his according to an embodiment disclosed in the present disclosure.

The controller 180 of the first mobile terminal 100 may analyze the received (or sensed) biometric signal to determine whether the wearer (or user) is awake or not and his or her psychological state.

As a result of the determination, the controller 180 may display a first user interface corresponding to a predetermined authentication method when the wearer (or user) is sleeping or in a psychological state satisfying a predetermined abnormal condition, and display a second user interface corresponding to another authentication method on the display unit 151 when information received through the first user interface is transmitted to the external server 50.

Here, the process of determining whether the wearer (or user) is awake or not based on a biometric signal denotes determining whether the user is in a non-REM (NREM) state or in a REM sleep state which is a sleep state that can be easily awaken or in an already got up state (i.e., awake state) based on the wearer's (or user's) biometric signal (for example, pulse signal, electrocardiogram signal, etc.). Such an algorithm for determining a sleep state may be stored in advance in the memory 160.

Furthermore, a psychological state in which the wearer (or user) satisfies a predetermined abnormal condition denotes the case of sensing a stimulation signal greater than a predetermined threshold value or satisfying a condition where the wearer's (user's) stress index, exciting index, or the like corresponding to a change of biometric signal is greater than a predetermined threshold value. Meanwhile, as described above, when it is unclear whether or not a psychological state determined by the analysis of the biometric signal satisfies an abnormal condition, data received through another sensor provided in the first mobile terminal 100 or second mobile terminal 300 may be used as auxiliary data for determining the wearer's (or user's) psychological state.

Otherwise, as a result of the determination, when the wearer (or user) is in a sleeping state or in a psychological state satisfying a predetermined abnormal condition, the controller 180 may display a third user interface corresponding to another authentication method with an increased security level instead of the first user interface corresponding to a predetermined authentication method on the display unit 151.

For example, referring to FIG. 6A, even though the wearer of the second mobile terminal 300 applies a touch to the display unit 151 of the first mobile terminal 100 to check that he or she is the same person (*a*), when determined that the wearer is sleeping, a message 602 indicating the wearer's status such as "the user is sleeping" may be displayed on the display unit 151 of the first mobile terminal 100 (*b*). Then, a user interface screen 603 corresponding to another authentication method (for example, password authentication method) may be displayed instead of the predetermined authentication method (fingerprint authentication method). In other words, since user authentication cannot be carried out while the user is sleeping, feature-based authentication methods (for example, fingerprint authentication method, face authentication method, hand shape authentication method, etc.) using a user's physical features may be preferably excluded from the another authentication method.

Furthermore, the controller 180 may analyze the received biometric signal, and combine an interfering signal with input information received through the user interface displayed on the display unit 151 when the wearer (or user) is sleeping and in a psychological state satisfying a predetermined abnormal condition as a result of determining whether the wearer (or user) is awake or not and his or her psychological state.

For example, even though the wearer of the second mobile terminal 300 applies a touch to the display unit 151 of the first mobile terminal 100 to check that he or she is the same person, and accordingly fingerprint information is entered as illustrated in FIG. 6B(a), when determined that the wearer of the second mobile terminal 300 is sleeping or in a psychological state satisfying an abnormal condition as a result of the analysis of the sensed biometric signal, a predetermined "interfering signal" may be combined with the received fingerprint information prior to sending it to the external server 50 as illustrated in FIG. 6B. As a result, a message 604 such as "fingerprint authentication has been failed" may be displayed on the display unit 151 of the first mobile terminal 100. When an interfering signal is combined with the received fingerprint information, the matching with previously registered user will be failed.

Furthermore, though not shown in the drawing, the controller 180 may recognize whether or not the wearer's psychological state satisfying a predetermined abnormal condition is out of a predetermined threshold value as a result of the analysis of the received biometric signal. Here, the predetermined threshold value as an extreme degree of the psychological state satisfying an abnormal condition denotes extremely excited, tense and angry state being maintained for a predetermined period of time.

In this manner, when the psychological state satisfying a predetermined abnormal condition out of a predetermined threshold value is maintained greater than a predetermined period of time or an information input to at least one of the first and the second user interface corresponding to the presented authentication method is sensed, the controller 180 may suspend a process associated with user authentication and provide a warning message to the display unit 151 or the external server 50. In other words, the checking of the wearer's sleep and psychological state may be continuously carried out from the time of performing primary authentication to the time of completing final user authentication.

On the other hand, according to an embodiment of the present disclosure, an authentication method for user authentication may be implemented to be changed through a simple input (for example, a predetermined user gesture, a voice command, a predetermined number of touch inputs) of the wearer of the second mobile terminal 300 in the aspect of user convenience.

For such an example, FIG. 7 is a conceptual view for explaining a method of changing an authentication method of user authentication based on a predetermined user gesture subsequent to wearer authentication to the second mobile terminal 300 according to an embodiment disclosed in the present disclosure.

Specifically, when wearer authentication to the second mobile terminal 300 is completed, and a predetermined user gesture is sensed while the second mobile terminal 300 is worn, the controller 180 of the first mobile terminal 100 may change the determined authentication method to perform user authentication according to an authentication method corresponding to the sensed user gesture. Furthermore, such a change of the authentication method may include the case of changing a device on which a user interface corresponding to the determined authentication method is displayed.

For example, when a touch input for knocking a predetermined number of times on the display unit 351 of the second mobile terminal 300 is sensed as illustrated in FIG. 7B subsequent to completing wearer authentication to the second mobile terminal 300 as illustrated in FIG. 7A, a user interface screen 702 corresponding to a fingerprint authentication method may be displayed on the display unit 351 of the second mobile terminal 300 onto which the touch input is sensed as illustrated in FIG. 7C. When the wearer enters fingerprint information on the display unit 351 of the second mobile terminal 300, the entered fingerprint information is provided to the external server 50 through the first mobile terminal 100 as illustrated in FIG. 7D.

On the other hand, even after wearer authentication for the second mobile terminal 300 has been completed, an input for the presented authentication method may be preferably carried out with a more convenient method for the user. For example, the user may enter authentication information using both devices or enter authentication information using only either one device according to the extent of separation between the first mobile terminal 100 and second mobile terminal 300.

In other words, it is advantageous in continuously confirming that the wearer is the user himself or herself when both devices are used during the input of authentication information, but it may cause difficulties if both devices should be all used even when the extent of separation between both devices is far (for example, when the terminal is put in a bag).

Figure 8:
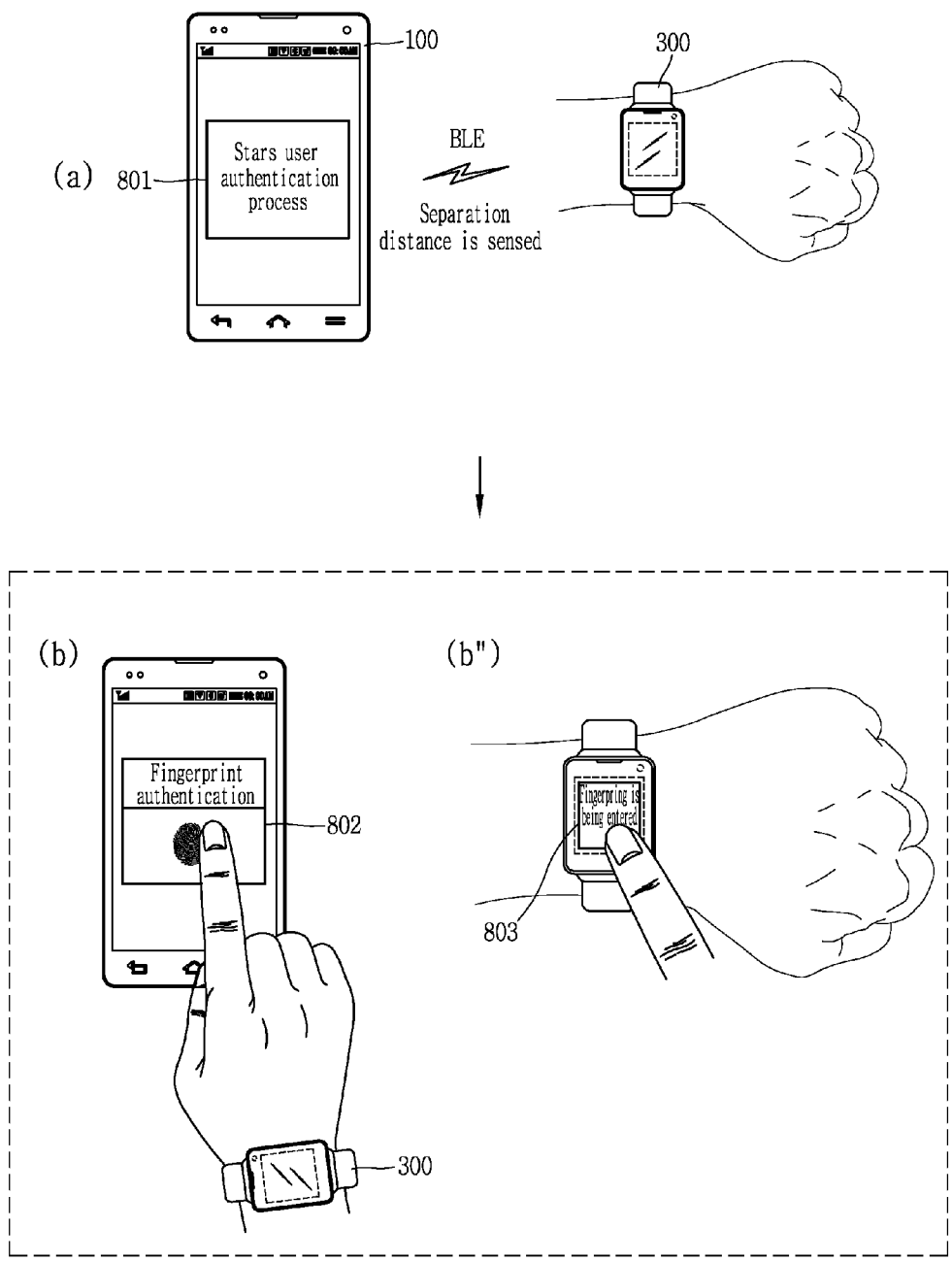
FIG. 8 is a conceptual view for explaining a method of determining a device for providing an input screen corresponding to authentication method according to a separation distance between a mobile terminal and a second mobile terminal according to an embodiment disclosed in the present disclosure.

Accordingly, FIG. 8 presents a method of determining a device for providing an input screen corresponding to authentication method according to a separation distance between a mobile terminal and a second mobile terminal according to an embodiment disclosed in the present disclosure.

The second mobile terminal 300 paired with the first mobile terminal 100 may perform wireless communication, particularly, Bluetooth low energy (BLE) communication, to sense a separation distance between both devices. When Bluetooth low energy (BLE) communication is carried out in this manner, it may be possible to sense a separation distance between both devices in a relatively accurate manner with wireless communication at low power (for example, 1-5% of power of the Bluetooth communication specification) while maintaining stability and security which are advantages of Bluetooth communication. The Bluetooth low energy (BLE) communication may be carried out separately from wireless communication for transmitting and receiving between the first mobile terminal 100 and second mobile terminal 300.

The controller 180 of the first mobile terminal 100 may sense a separation distance between the body 100 and second mobile terminal 300 according to the Bluetooth low energy (BLE) communication, and determine a device for providing an input screen corresponding to an authentication method determined based on the sensed separation distance.

Specifically, when the sensed separation distance is within a predetermined range, the controller 180 may provide an input corresponding to the authentication method using the body 100 and the second mobile terminal 300. For example, as illustrated in FIG. 8B, it may be necessarily required to enter fingerprint information on a user interface screen 802 with a fingerprint authentication method displayed on the display unit 151 of the first mobile terminal 100 with a hand wearing the second mobile terminal 300. At this time, a change value of biometric signal sensed through the hand with which the fingerprint information has been entered may be analyzed to recognize whether or not the wearer enters fingerprint information with his or her hand wearing the second mobile terminal 300. In this case, when the wearer enters fingerprint information with his or her hand on which the second mobile terminal 300 is not worn, the processing of authentication may not be carried out.

On the other hand, when the sensed separation distance is out of a predetermined range, the controller 180 may control an input corresponding to the authentication method to be provided using either one of the body 100 and the second mobile terminal 300.

For example, as illustrated in FIG. 8B", a user interface screen 803 corresponding to a fingerprint authentication method may be displayed only on the second mobile terminal 300 to enter fingerprint information only through the display unit 351 of the second mobile terminal 300. To this end, the first mobile terminal 100 may transmit visual information associated with a user interface corresponding to the determined authentication method to the second mobile terminal 300.

Hereinafter, a method of providing a user interface corresponding to a user authentication method when the second mobile terminal 300 is not worn by anyone will be described.

Figure 9:
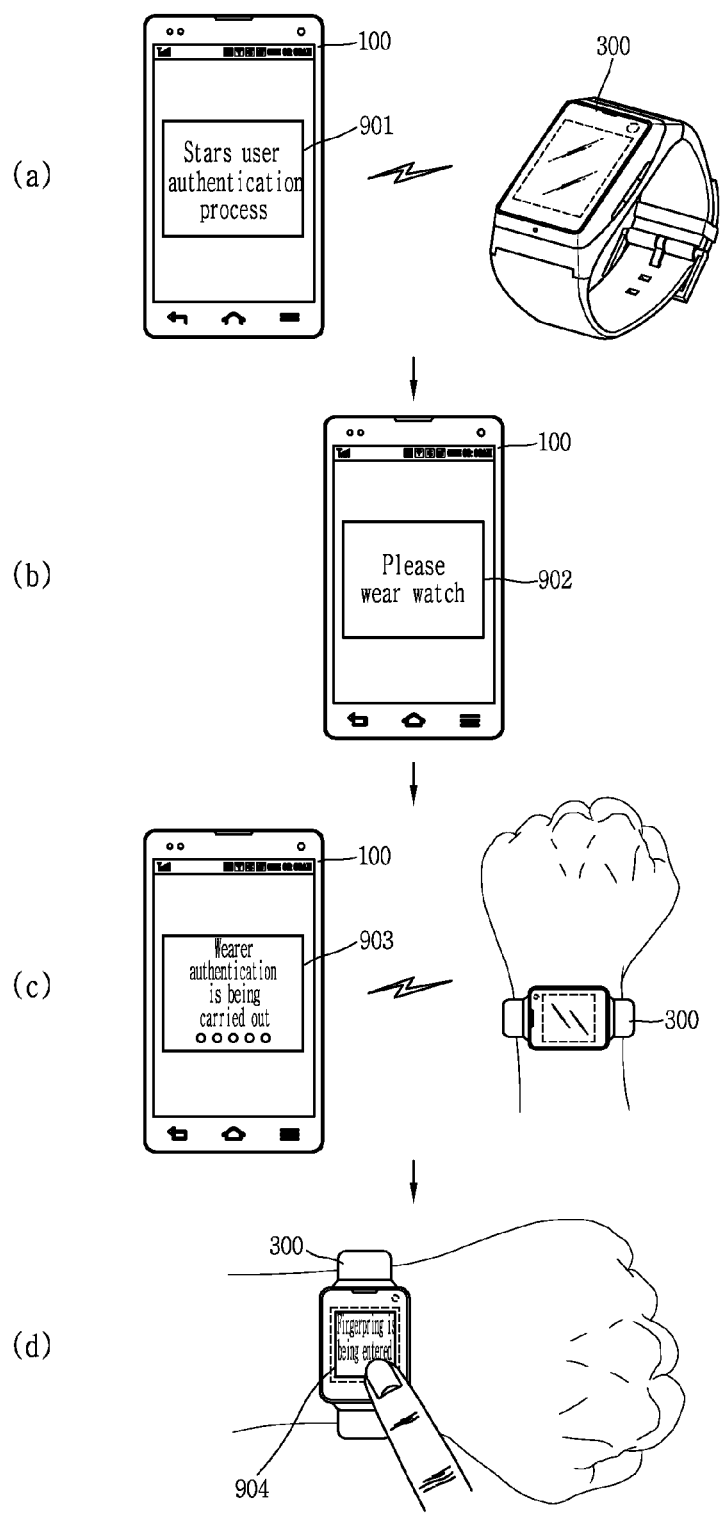
FIGS. 9 and 10 are conceptual views for explaining a method of providing an authentication method of user authentication when a second mobile terminal is not worn according to an embodiment disclosed in the present disclosure.
Figure 10:
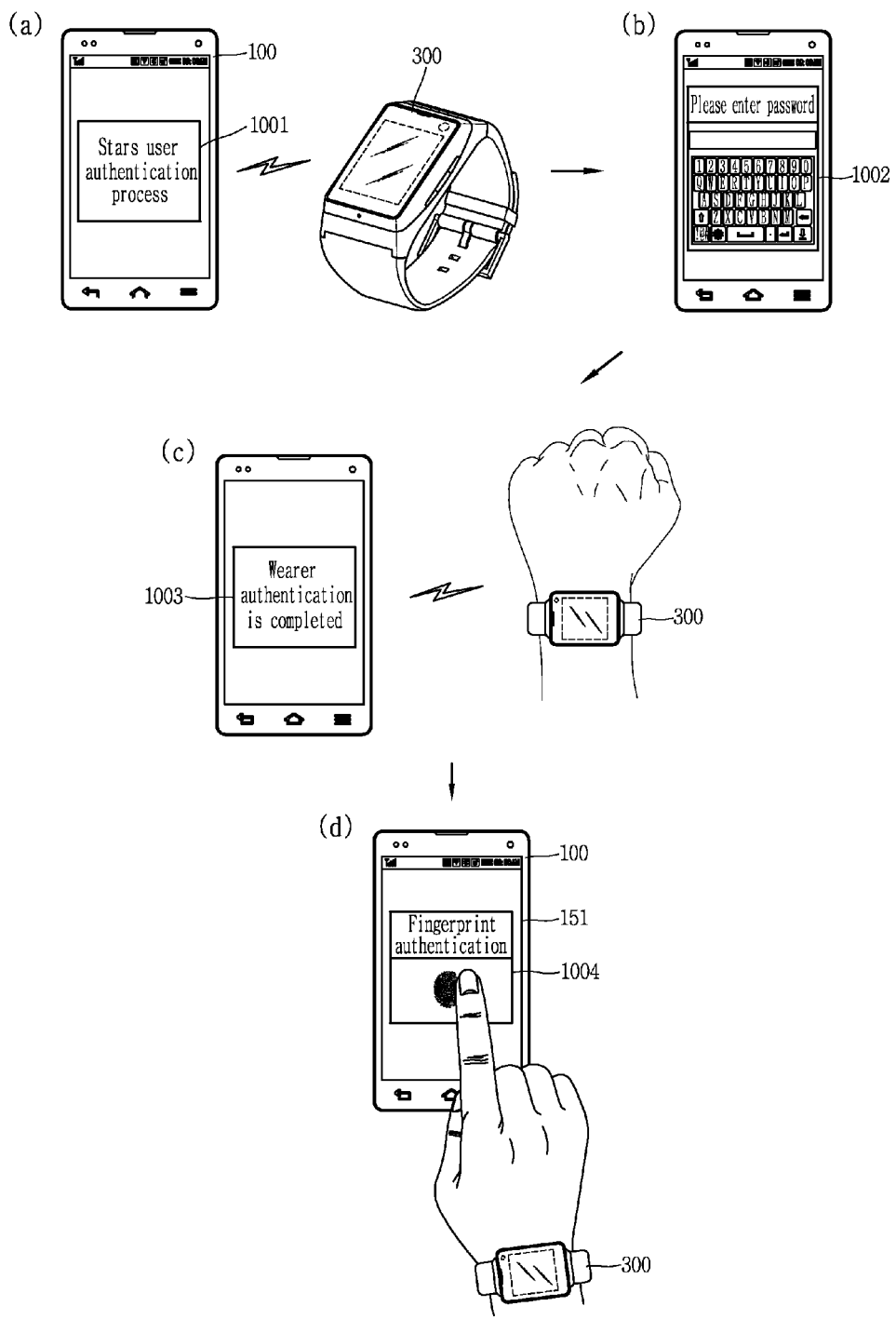

In this regard, FIGS. 9 and 10 are conceptual views for explaining a method of providing an authentication method of user authentication when a second mobile terminal is not worn according to an embodiment disclosed in the present disclosure.

When a user authentication process is carried out, a wireless signal for sensing the wearing of the second mobile terminal paired with the first mobile terminal 100 is transmitted to the second mobile terminal 300.

When there is no response signal from the second mobile terminal 300 in response to the transmission of the wireless signal or it is sensed that the second mobile terminal 300 is not worn as a result of receiving the response signal, the controller 180 may display a message for guiding the wearing of the second mobile terminal on the display unit 151. Meanwhile, the message may be implemented with another type of alarm such as a sound, a vibration, and a guide voice.

For example, when the first mobile terminal 100 transmits a wireless signal to the second mobile terminal 300 paired therewith to sense the non wearing of the second mobile terminal 300 as illustrated in FIG. 9A, a message 902 for guiding the wearing thereof, for example, "Please wear a watch", may be displayed on the display unit 151 of the first mobile terminal 100 as illustrated in FIG. 9B. Accordingly, when the user wears the second mobile terminal 300, a wearer authentication process is carried out as illustrated in FIG. 9C, and when the wearer authentication is completed, a user interface screen 904 corresponding to a fingerprint authentication method is displayed on the display unit 351 of the second mobile terminal 300 as illustrated in FIG. 9D.

On the other hand, according to another example, user authentication may be carried out even while the user does not wear the second mobile terminal 300. In this case, there may be a case where the user wears the second mobile terminal 300 on the way or unwears the second mobile terminal 300 prior to the completion of the wearer authentication.

Specifically, the controller 180 of the first mobile terminal 100 may perform wireless communication with the second mobile terminal 300 even after displaying a first user interface corresponding to the determined authentication method on the screen to sense a change based on the wearing or unwearing of the second mobile terminal.

When such a change is sensed, the controller 180 may change a previously displayed first user interface to a second user interface corresponding to another authentication method based on the sensed change. For example, when a user authentication process is started to sense the non-wearing of the second mobile terminal 300 in FIG. 10A, a user interface screen 1002 with the corresponding authentication method, for example, a password authentication method, is displayed only on the first mobile terminal 100 as illustrated in FIG. 10B.

At this time, when the user wears the second mobile terminal 300 prior to the completion of a password input to the user interface screen 1002, wearer authentication is carried out to display visual information 1003 corresponding to a result of the execution of the wearer authentication as illustrated in FIG. 10C. Then, a user interface screen 1004 with a new authentication method is displayed on the display unit 151. Then, the wearer of the second mobile terminal 300 may enter fingerprint information to the changed user interface screen 1004 to process user authentication as illustrated in FIG. 10D.

Furthermore, when a change based on the wearing or unwearing of the second mobile terminal 300 is sensed, the controller 180 may transmit at least part of visual information associated with the previously displayed first user interface to the second mobile terminal. For example, when the second mobile terminal 300 is worn on the way, it is determined that the user intends to enter authentication information through the second mobile terminal 300 other than the first mobile terminal 100, at least part of visual information associated with the previously displayed first user interface may be displayed on the second mobile terminal.

On the other hand, when a mobile terminal according to an embodiment of the present disclosure is implemented with a type configured to be wearable on a specific portion of a human body, a user authentication process may be independently carried out without being paired with another mobile terminal.

Figure 11:
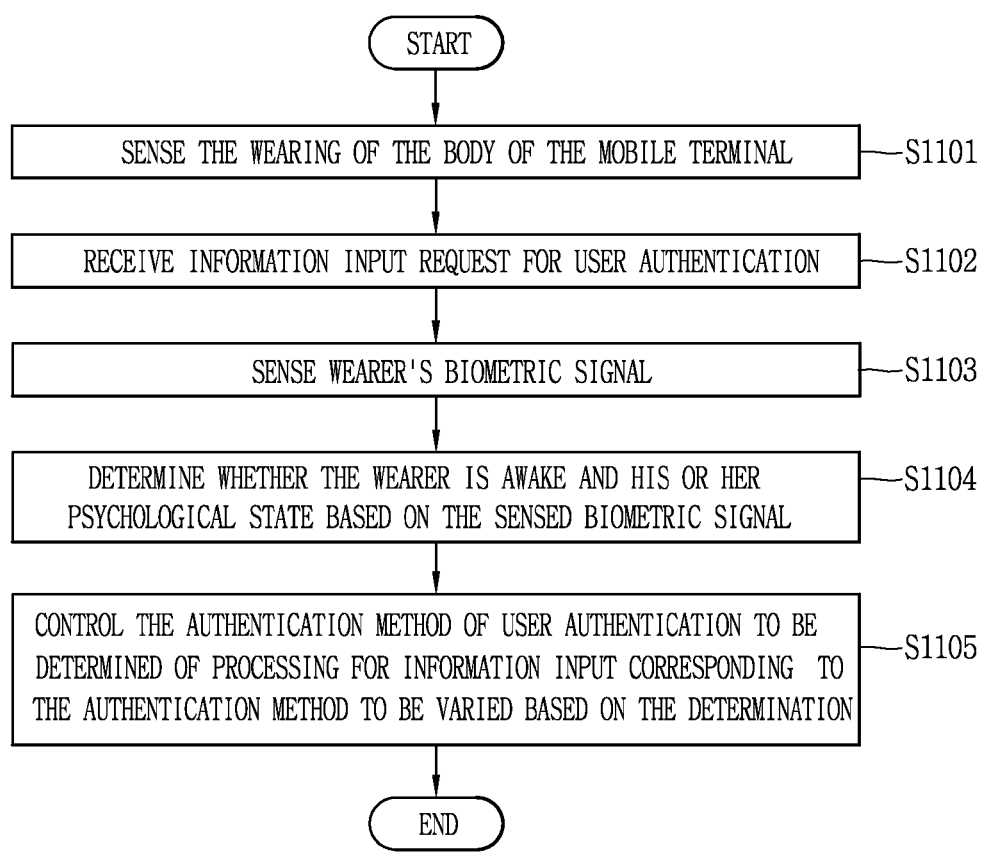
FIG. 11 is a flow chart for explaining a control method of a mobile terminal according to another embodiment disclosed in the present disclosure.

In this regard, FIG. 11 is a flow chart for explaining a control method of a mobile terminal according to another embodiment disclosed in the present disclosure. Here, a watch type mobile terminal has been described as an example, but it may be of course implemented with a glass type, a necklace type or a ring type mobile terminal configured to be wearable on a head of a human body.

As illustrated in FIG. 11, it may be possible to sense the wearing of the first mobile terminal 100 (see FIG. 2A) configured to be wearable on a specific portion of a human body (S1101). For example, a band provided in a watch type mobile terminal 100 enwrapping a user's wrist or a paster being coupled to an end of the band may be sensed, thereby sensing the wearing of the body of the mobile terminal 100.

In this manner, when the wearing of the body of the mobile terminal 100 is sensed, it may be possible to sense a biometric signal of the wearer of the body in response to an information input request for user authentication being received from the external server 50 (see FIG. 1) connected to the body of the mobile terminal (S1103).

Then, whether the wearer is awake or not and his or her psychological state is determined based on the sensed biometric signal (S1104). The determination may be continuously carried out until the completion of a process associated with user authentication. Then, the controller 180 of the mobile terminal 100 may control the authentication method of the user authentication or processing for an information input corresponding to the authentication method to be varied based on the determination.

Specifically, the controller 180 of the mobile terminal 100 allows the sensed biometric signal to be matched to user information previously registered with the first mobile terminal 100 to determine the authentication method of the user authentication according to the matching result. For example, when the sensed biometric signal matches the previously registered user information, it is regarded that primary determination for the user himself or herself authentication has been carried out, thereby performing user authentication using an authentication method with a convenient user input function (for example, fingerprint authentication method). Furthermore, for example, when the sensed biometric signal does not match the previously registered user information, it is regarded that a user authentication process is carried out by a third party, thereby performing user authentication using an authentication method with an increased security level (for example, an additional input such as a password authentication method, an OPT authentication method, etc.).

When determined that the wearer of the mobile terminal 100 is sleeping or in a psychological state satisfying a predetermined abnormal condition according to the analysis of the sensed biometric signal, the controller 180 of the mobile terminal 100 may combine a predetermined interfering signal with an information input corresponding to the authentication method. Otherwise, when determined that the wearer of the mobile terminal 100 is sleeping or in a psychological state satisfying a predetermined abnormal condition based on the sensed biometric signal, the controller 180 may change a predetermined authentication method to another authentication method or additionally request an input corresponding to another authentication method, thereby enhancing the security level in terms of quality.

As described above, in a mobile terminal and a control method thereof according to an embodiment of the present disclosure, a different authentication method may be provided according to whether a terminal configured to be wearable on a specific portion of a human body is worn or not and whether it is worn by the user himself or herself or not, thereby performing user authentication in a natural and convenient manner. Furthermore, a terminal wearer's biometric signal may be sensed while entering information for user authentication to determine whether the wearer is awake or not and his or her psychological state, thereby preventing user authentication from being carried out in a user's unwanted state in advance. For example, when determined a case where the wearer performs an information input in a threatening or coercive state or the information input is unwittingly carried out by a third party in his or her sleeping state, it may disallow authentication processing, thereby enhancing the security of user authentication in terms of quality.

Furthermore, the foregoing present disclosure may be implemented as codes readable by a computer on a medium written by the program. The computer-readable media includes all types of recording devices in which data readable by a computer system can be stored. Examples of the computer-readable media may include HDD (Hard Disk Drive), SSD (Solid State Disk), SDD (Silicon Disk Drive), ROM, RAM, CD-ROM, a magnetic tape, a floppy disk, an optical data storage device, and the like, and also include a device implemented via a carrier wave (for example, transmission via the Internet). The computer may include the controller 180 of the terminal. The present invention may be embodied in other specific forms without departing from the concept and essential characteristics thereof. The detailed description is, therefore, not to be construed as illustrative in all respects but considered as restrictive. The scope of the invention should be determined by reasonable interpretation of the appended claims and all changes that come within the equivalent scope of the invention are included in the scope of the invention.

What is claimed is:

1. A mobile terminal, comprising:
a body;
a wireless communication unit configured to receive an information input request for user authentication from an external server connected to the body; and
a controller configured to:
transmit a wireless signal for sensing a wearing of a second mobile terminal formed to be paired with the body and wearable on a specific portion of a human body to the second mobile terminal in response to the request,
perform wearer authentication for the second mobile terminal in response to receiving at least one of a response signal to the wireless signal from the second mobile terminal and a wearer's biometric signal sensed through the second mobile terminal, and
control an authentication method of the wearer authentication or processing for the information input request corresponding to the authentication method to be determined in a different manner based on at least one of an execution result of the wearer authentication and an analysis result of the received biometric signal, and
wherein when a change according to the wearing of the second mobile terminal is sensed subsequent to displaying a first user interface corresponding to the determined authentication method, the controller is further configured to:
change the first user interface to a second user interface corresponding to another authentication method, or
transmit at least part of visual information associated with the first user interface to the second mobile terminal based on the change.

2. The mobile terminal of claim 1, wherein the authentication method comprises at least one of a user's fingerprint authentication, face authentication, voice authentication, biometric information authentication, signature authentication, handwriting authentication, password authentication, and gesture authentication using at least one sensor provided in the body, and
processing for an information input corresponding to the authentication method is varied according to the wearer's psychological state determined by the analysis result of the biometric signal.

3. The mobile terminal of claim 1, wherein the controller is further configured to:

activate a biometric signal sensing function in response to a touch applied to one region of a display unit while the second mobile terminal is worn, and
display a changed screen corresponding to the activation of the biometric signal sensing function on the display unit.

4. The mobile terminal of claim 3, wherein the controller is further configured to:
compare a first biometric signal sensed according to the activation of the biometric signal sensing function with a second biometric signal received from the second mobile terminal, and
determine whether or not they are the same person according to the comparison result.

5. The mobile terminal of claim 1, wherein the controller is further configured to:
analyze the received biometric signal to determine whether the wearer is awake or not and his or her psychological state,
match the received biometric signal to a prestored user information when the wearer is in an awake state and in a psychological state satisfying a predetermined normal condition as a result of the determination, and
display a user interface corresponding to the received biometric signal.

6. The mobile terminal of claim 1, wherein the controller is further configured to:
analyze the received biometric signal to determine whether the wearer is awake or not and his or her psychological state,
when the wearer is sleeping and in a psychological state satisfying a predetermined abnormal condition as a result of the determination, and
display the second user interface corresponding to the another authentication method subsequent to displaying the first user interface corresponding to the predetermined authentication method on the displays unit, or
display a third user interface corresponding to an authentication method with an increased security level instead of the first user interface.

7. The mobile terminal of claim 1, wherein the controller is further configured to:
analyze the received biometric signal to determine whether the wearer is awake or not and his or her psychological state, and
when the wearer is sleeping and in a psychological state satisfying a predetermined abnormal condition as a result of the determination,
display a user interface corresponding to a predetermined authentication method on a display unit, and control an interfering signal to be combined with input information received through the displayed user interface.

8. The mobile terminal of claim 6, wherein when a predetermined time has passed or an input for at least one of the first and the second user interface is sensed while the wearer's psychological state satisfying a predetermined abnormal condition is out of a threshold value, the controller is further configured to:
suspend a process associated with user authentication, and provide a warning message to a display unit or the external server.

9. The mobile terminal of claim 1, wherein when the wearer authentication for the second mobile terminal is completed and a predetermined user gesture is sensed while the second mobile terminal is worn, the controller is further configured to:

change the determined authentication method to perform user authentication according to an authentication method corresponding to the sensed user gesture.

10. The mobile terminal of claim 1, wherein the controller is further configured to:
match the biometric signal received from the second mobile terminal to prestored user information to perform the wearer authentication for the second mobile terminal, and
control a predetermined authentication method to be changed or an input corresponding to the another authentication method to be additionally requested when the received biometric signal does not match the prestored user information.

11. The mobile terminal of claim 10, wherein when the received biometric signal does not match the pre-stored user information, the controller is further configured to:
control the wireless communication unit such that the changed authentication or visual information associated with the another authentication method is not transmitted to the second mobile terminal.

12. The mobile terminal of claim 1, wherein the wireless communication unit is further configured to perform Bluetooth low energy (BLE) communication with the second mobile terminal, and
the controller is further configured to:
sense a separation distance between the body and the second mobile terminal according to the Bluetooth low energy (BLE) communication, and
determine a device for providing an input screen corresponding to the determined authentication method based on the sensed separation distance.

13. The mobile terminal of claim 12, wherein the controller is further configured to:
control an input corresponding to the determined authentication method to be provided using the body and the second mobile terminal when the sensed separation distance is within a predetermined range, and
control an input corresponding to the determined authentication to be provided using only either one of the body and the second mobile terminal when the sensed separation distance is out of the predetermined range.

14. The mobile terminal of claim 1, wherein the controller is further configured to:
display a message for guiding the wearing of the second mobile terminal when the response signal is not received or it is sensed that the second mobile terminal is not worn as a result of the reception of the response signal.

15. A mobile terminal, comprising:
a body configured to be wearable on a specific portion of a human body;
a sensing unit configured to sense wearing to the body and sense a biometric signal of a wearer of the body in response to an information request input for user authentication from an external server connected to the body; and
a controller configured to:
determine whether the wearer is awake or not and his or her psychological state based on the sensed biometric signal, and
control an authentication method of the user authentication or processing for an information input corresponding to the authentication method to be varied based on the determination,
wherein when the wearer is determined to be awake or in a psychological state satisfying a predetermined normal condition based on the sensed biometric signal, the controller is further configured to:
match the sensed biometric signal to prestored user information to display the corresponding alarm, and
control the authentication method to be carried out based on a result of the match of the sensed biometric signal to the prestored user information.

16. The mobile terminal of claim 15, wherein when the wearer is determined to be sleeping or in a psychological state satisfying a predetermined abnormal condition based on the sensed biometric signal, the controller is further configured to:
combine a predetermined interfering signal with an information input corresponding to the authentication method.

17. The mobile terminal of claim 15, wherein when the wearer is determined to be sleeping or in a psychological state satisfying a predetermined abnormal condition based on the sensed biometric signal, the controller is further configured to:
control a predetermined authentication method to be changed or an input corresponding to another authentication method to be additionally requested.

* * * * *